(12) United States Patent
Yoon et al.

(10) Patent No.: US 10,372,279 B2
(45) Date of Patent: Aug. 6, 2019

(54) TOUCH WINDOW

(71) Applicant: LG INNOTEK CO., LTD., Seoul (KR)

(72) Inventors: Yeo Eun Yoon, Seoul (KR); Ho Min Lee, Seoul (KR); Jun Phill Eom, Seoul (KR); Joon Ki Hong, Seoul (KR); Dong Mug Seong, Seoul (KR); Dong Keon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 264 days.

(21) Appl. No.: 15/503,472

(22) PCT Filed: Aug. 6, 2015

(86) PCT No.: PCT/KR2015/008252
§ 371 (c)(1),
(2) Date: Feb. 13, 2017

(87) PCT Pub. No.: WO2016/024760
PCT Pub. Date: Feb. 18, 2016

(65) Prior Publication Data
US 2017/0228071 A1  Aug. 10, 2017

(30) Foreign Application Priority Data

Aug. 14, 2014 (KR) .......................... 10-2014-0106189
Jan. 13, 2015 (KR) .......................... 10-2015-0005577
Jan. 27, 2015 (KR) .......................... 10-2015-0013063

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04112* (2013.01)

(58) Field of Classification Search
CPC .................. G06F 3/044; G06F 3/0416; G06F 2203/04112
See application file for complete search history.

(56) References Cited

U.S. PATENT DOCUMENTS 6,896,981 B2   5/2005  Iwabuchi et al.
2009/0140990 A1*  6/2009  Chang .................... G06F 3/041
                                                                         345/173

(Continued)

FOREIGN PATENT DOCUMENTS

KR        10-1259843 B1     5/2013
KR    10-2014-0055097 A     5/2014

(Continued)

OTHER PUBLICATIONS

Search Report for International Application No. PCT/KR2015/008252.

*Primary Examiner* — Andrew Sasinowski
(74) *Attorney, Agent, or Firm* — LRK Patent Law Firm

(57) ABSTRACT

A touch window includes a substrate including an available area and an unavailable area; and an electrode layer formed on the substrate, wherein the electrode layer includes a conductive layer and a protective layer formed on the conductive layer, the protective layer is in direct contact with the conductive layer, the protective layer has a thickness different from that of the conductive layer, and the protective layer includes a black-based color.

19 Claims, 15 Drawing Sheets

(56) References Cited

U.S. PATENT DOCUMENTS

| | | | |
|---|---|---|---|
| 2009/0214839 A1* | 8/2009 | Kotsubo | H05K 3/182 |
| | | | 428/209 |
| 2013/0140065 A1* | 6/2013 | Koo | G06F 3/041 |
| | | | 174/256 |
| 2013/0215067 A1 | 8/2013 | Hwang et al. | |
| 2014/0015771 A1* | 1/2014 | Shin | G06F 3/041 |
| | | | 345/173 |
| 2014/0115878 A1 | 5/2014 | Kimura | |
| 2014/0152917 A1 | 6/2014 | Lee et al. | |
| 2015/0169110 A1* | 6/2015 | Nah | G06F 3/044 |
| | | | 345/174 |
| 2015/0212539 A1 | 7/2015 | Hong et al. | |

FOREIGN PATENT DOCUMENTS

| | | |
|---|---|---|
| KR | 10-2014-0071026 A | 6/2014 |
| WO | 2012-053818 A2 | 4/2012 |
| WO | 2014-058116 A1 | 4/2014 |

\* cited by examiner

TOUCH WINDOW

CROSS-REFERENCE TO RELATED APPLICATION(S)

This application is a U.S. National Phase entry from International Application No. PCT/KR2015/008252, filed Aug. 6, 2015, which claims priority under 35 U.S.C. § 119 to Korean Patent Application Nos. 10-2014-0106189, 10-2015-0005577 and 10-2015-0013063, filed Aug. 14, 2014, Jan. 13, 2015 and Jan. 27, 2015, respectively, the entire disclosure of which is incorporated by reference herein in its entirety.

BACKGROUND

1. Field of the Invention

The present invention relates to a touch window.

2. Description of Related Art

Recently, a touch window in which an input operation is performed by bringing an image displayed on a display device into contact with a finger or an input device such as a stylus is applied to various electronic products.

The touch window may be representatively classified into a resistive film type touch window and a capacitance type touch window. In the resistive film type touch window, when a pressure is applied to an input device, a change in resistance according to a connection between electrodes is detected and thus a position is detected. In the capacitance type touch window, when a finger is in contact therewith, a change in a capacitance between electrodes is detected and thus a position is detected. In consideration of convenience in a manufacturing method, a sensing ability and so on, the capacitance type touch window recently receives an attention in a small model.

An indium tin oxide (hereinafter, ITO) which is generally well known may be used in a transparent electrode of the touch window. However, in the case of the ITO, there are many problems. In an ITO electrode, since an indium material forming the ITO is high in scarcity value and a vacuum process such as a sputtering method or a chemical vapor deposition method is essential for ITO coating, it has a relatively high manufacturing cost. Also, it is easy for the ITO electrode to be physically damaged by bending and twisting of a substrate, and a property thereof as the electrode is deteriorated, and thus there is a problem that it is not suitable for a flexible element. Also, the ITO electrode has a high resistance characteristic and is limited in increasing an area thereof. To solve such problems, a study on an alternative electrode is actively proceeding. In particular, it is intended to replace the ITO by forming a metal material into a mesh.

However, when the electrode is formed of a metal material, a metal electrode may be oxidized and thus a problem in a driving property such as resistance may be generated. In particular, the touch window used in a vehicle is usually exposed to a high temperature, an extremely low temperature or high humidity, and thus there is a problem in reliability thereof.

Also, since light incident from an outside may be visible from the outside due to a glittering characteristic of a metal, visibility of the touch window may be degraded.

Therefore, a touch widow having a new structure for solving the above problems is required.

SUMMARY

The present invention is directed to a touch window having enhanced reliability and visibility.

According to an aspect of the present invention, there is provided a touch window according to a first embodiment including a substrate; a resin layer disposed on the substrate and including a first pattern and a second pattern; and an electrode layer disposed on the second pattern, wherein the electrode layer includes a conductive layer having a width smaller than that of the second pattern; and a first protective layer formed to surround an upper surface and a side surface of the conductive layer.

According to another aspect of the present invention, there is provided a touch window according to a second embodiment including a substrate including an available area and an unavailable area; and an electrode layer formed on the substrate, wherein the electrode layer includes a conductive layer and a protective layer formed on the conductive layer, and the protective layer includes a metal nitride compound, and 1.3 weight % or more of nitrogen is included with respect to the entire metal nitride compound.

According to still another aspect of the present invention, there is provided a touch window according to a third embodiment including a substrate and an electrode layer disposed on the substrate, wherein the electrode layer includes a conductive layer and a protective layer disposed on at least one surface of the conductive layer, and the protective layer includes niobium (Nb). Also, another touch window according to the third embodiment may include a buffer layer disposed between the conductive layer and the protective layer.

The details of one or more embodiments are set forth in the accompanying drawings and the description below. Other features will be apparent from the description and drawings, and from the claims.

BRIEF DESCRIPTION OF THE DRAWINGS

Embodiments will be described in detail with reference to the following drawings in which like reference numerals refer to like elements, and wherein.

DETAILED DESCRIPTION

Figure 1:
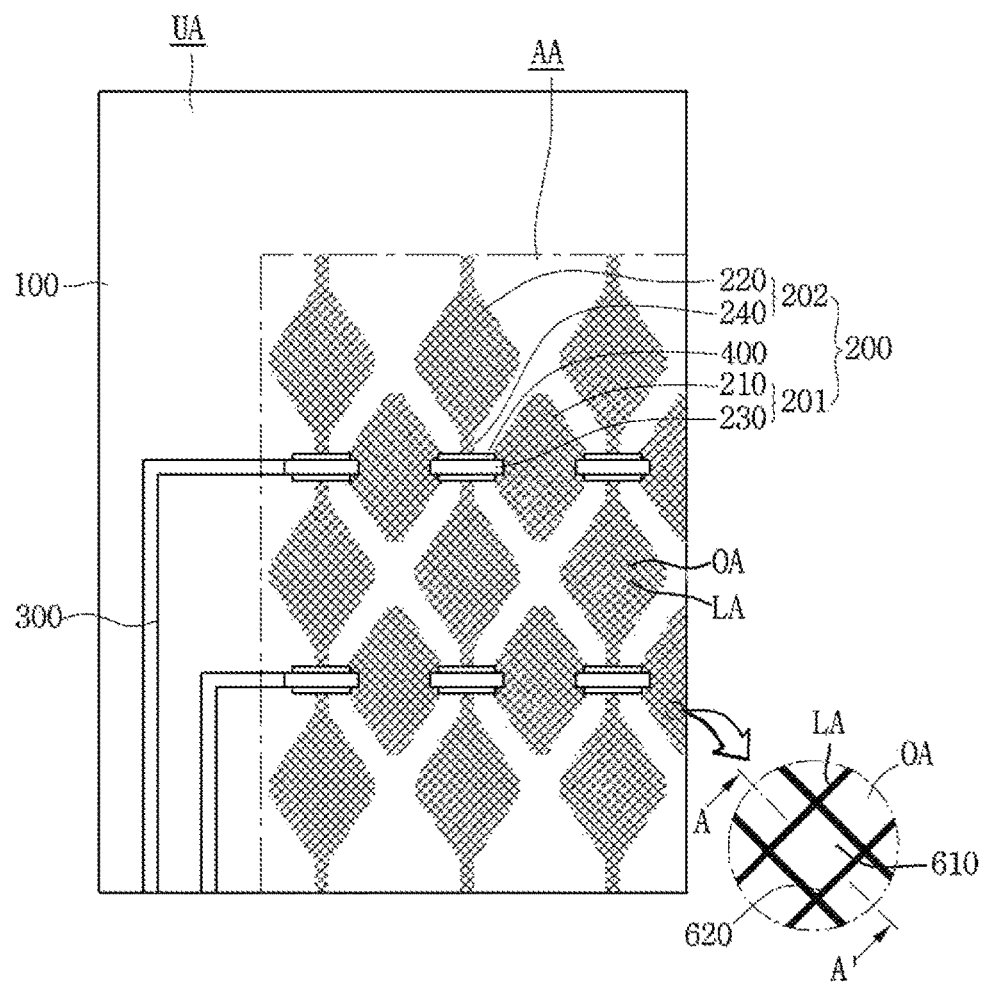
FIG. 1 is a plan view of a touch window according to a first embodiment of the present invention.

In the description of the preferred embodiments, it will be understood that when a layer (or film), region, pattern or structure is referred to as being 'on' or 'under' another layer (or film), region, pad or pattern, the terminology of 'on' or 'under' includes both the meanings of 'directly' and 'indirectly' via another layer. Further, the reference about 'on' or 'under' each layer will be made on the basis of drawings.

It should be noted that if it is described in the specification that one component is "connected," "coupled" or "joined" to another component, the former may be directly "connected," "coupled," and "joined" to the latter or "connected", "coupled", and "joined" to the latter via another member. Also, when it is described that a certain portion includes a certain component, this means that another component is not excluded, but the portion may further include another component, as long as an opposite description is not specifically made.

In the drawings, since a thickness or a size of each layer (film), area, pattern or structure may be modified for convenience of explanation or clarity, it does not reflect entirely the actual size.

Reference will now be made in detail to the embodiments of the present disclosure, examples of which are illustrated in the accompanying drawings.

First, a touch window according to a first embodiment of the present invention will be described with reference to FIGS. 1 to 3. FIG. 1 is a plan view of a touch window according to a first embodiment of the present invention, and FIGS. 2 and 3 are cross-sectional views taken by cutting A-A' area of FIG. 1 according to the first embodiment of the present invention.

Figure 2:
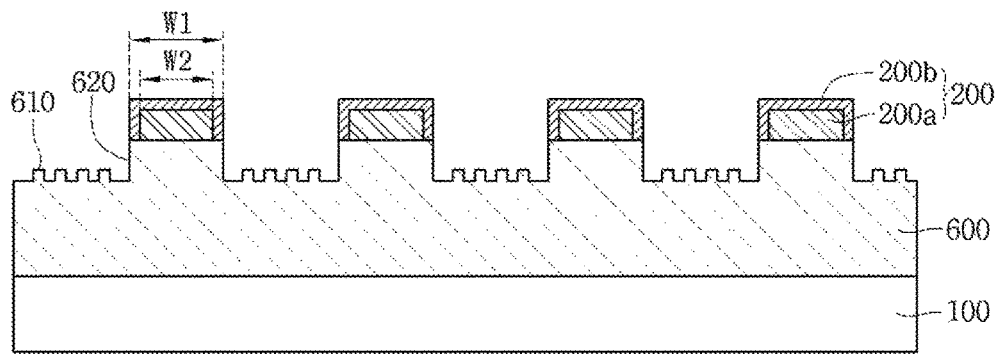
FIG. 2 is a cross-sectional view taken by cutting A-A' area of FIG. 1 according to the first embodiment of the present invention.
Figure 3:
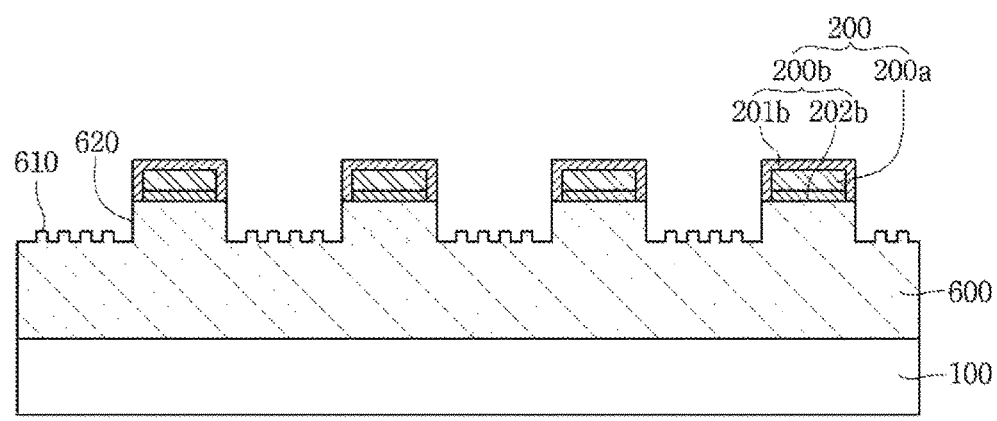
FIG. 3 is another cross-sectional view taken by cutting the A-A' area of FIG. 1 according to the first embodiment of the present invention.

Referring to FIGS. 1 and 2, a touch window 10 according to the first embodiment of the present invention includes a substrate 100 which is divided into an active area AA and an inactive area UA. Specifically, the active area AA is an area which detects a position of an input device (e.g., a finger or the like) and allows a user to input a touch command.

Here, an electrode layer 200 may be formed at the active area AA to detect the input device. And a wired electrode 300 for electrically connecting the electrode layer 200 may be formed at the inactive area UA. Also, although not illustrated in the drawings, an external circuit or the like which is connected to the wired electrode 300 may be located at the inactive area UA.

When the input device such as the finger is in contact with the touch window, a difference of capacitance occurs at a portion which is in contact with the input device, and the portion at which such a difference occurs may be detected as a contact position. The touch window will be described in more detail.

The substrate 100 may be formed of various materials which may support the electrode layer 200, the wired electrode 300 and a circuit board formed thereon. The substrate 100 may be rigid or flexible. For example, the substrate 100 may include glass or plastic. Specifically, the substrate 100 may include chemically strengthened/semi-tempered glass such as soda lime glass and aluminosilicate glass, may include reinforced or flexible plastic such as polyimide (PI), polyethylene terephthalate (PET), propylene glycol (PPG) and polycarbonate (PC), or may include sapphire.

The sapphire has very excellent electric characteristics, such as permittivity, so that a touch response speed may be remarkably increased and a space touch such as hovering may be easily implemented. In addition, since the sapphire has high surface strength, it is applicable as a cover substrate. Here, the hovering is a technique for recognizing coordinates even at a slight distance from a display.

Also, the substrate 100 may include an optically isotropic film. For example, the substrate 100 may include a cyclic olefin copolymer (COC), a cyclic olefin polymer (COP), optically isotropic polycarbonate (PC) or optically isotropic polymethylmethacrylate (PMMA).

Also, the substrate 100 may be bent while having a partially curved surface. That is, the substrate 100 may be bent while having a partially flat surface and a partially curved surface. More specifically, the substrate 100 may be bent while an end thereof has a curved surface or may be bent or curved while having a surface including a random curvature.

Also, the substrate 100 may be a flexible substrate having a flexible property. Also, the substrate 100 may be a curved or bended substrate. That is, the touch window including the substrate 100 may also be formed to have the flexible, curved or bended property. Accordingly, the touch window according the embodiment may be easily carried and may be changed in various designs.

The wired electrode 300 is formed on the inactive area UA of the substrate 100. The wired electrode 300 may apply an electric signal to the electrode layer 200. The wired electrode 300 may be formed at the inactive area UA to be invisible.

Meanwhile, although not shown in the drawings, a circuit board connected to the wired electrode 300 may be further located. Various types of printed circuit boards may be used as the circuit board. For example, a flexible printed circuit board (FPCB) or the like may be used.

Also, an outer dummy layer (not shown) may be formed on the inactive area UA of the substrate 100. The outer dummy layer may be coated with a material having a predetermined color so that the wired electrode 300 and the printed circuit board for connecting the wired electrode 300 to an external circuit are invisible from an outside. The outer dummy layer may have a color which is suitable to a desired exterior. For example, the outer dummy layer may include a black pigment and thus may have a black color. And a desired logo or the like may be formed on the outer dummy layer in various methods. Such an outer dummy layer may be formed by a deposition, printing or wet coating process.

The electrode layer 200 may be formed on the active area AA of the substrate 100. The electrode layer 200 may be disposed on the active area AA and may serve as a sensor for sensing a touch. That is, the electrode layer 200 may detect whether the input device such as the finger is in contact therewith. The electrode layer 200 includes a first electrode layer 201 and a second electrode layer 202.

The first electrode layer 201 includes a first sensing electrode 210 and a first connecting electrode 230 for connecting the first sensing electrode 210. The first sensing electrode 210 may extend in one direction. Also, the first connecting electrode 230 may connect the first sensing electrode 210 in one direction.

The second electrode layer 202 includes a second sensing electrode 220 and a second connecting electrode 240 for connecting the second sensing electrode 220. The second sensing electrode 220 may extend in the other direction intersecting with the one direction. Also, the second connecting electrode 240 may connect the second sensing electrode 220 in the other direction.

The first sensing electrode 210, the second sensing electrode 220 and the second connecting electrode 240 are disposed on the substrate 100. The first sensing electrode 210, the second sensing electrode 220 and the second connecting electrode 240 may be disposed to be in contact with the substrate 100. The first sensing electrode 210, the second sensing electrode 220 and the second connecting electrode 240 are disposed on the same plane.

Meanwhile, the first connecting electrode 230 electrically connects the first sensing electrode 210. At this point, an insulating layer 400 is disposed between the first connecting electrode 230 and the second connecting electrode 240. An electrical short between the first connecting electrode 230 and the second connecting electrode 240 may be prevented by the insulating layer 400. The insulating layer 400 may be formed of a transparent insulating material which insulates the first connecting electrode 230 and the second connecting electrode 240. For example, the insulating layer 400 may be formed of a metallic oxide such as a silicon oxide or an acrylic resin.

FIG. 1 illustrate s a state in which two types of electrode layers 200 having a shape which extends on the substrate 100 in one direction and a shape which extends thereon in the other direction are included. However, the embodiment is not limited thereto. Therefore, the electrode layer 200 may be formed to include only the shape which extends in one direction.

That is, the first electrode layer 201 and the second electrode layer 202 may be formed on one surface of one substrate 100. Also, the first electrode layer 201 and the second electrode layer 202 may be disposed on one surface and the other surface of one substrate 100, respectively. Furthermore, the first electrode layer 201 and the second electrode layer 202 may be disposed on two substrate s, respectively.

Further, FIG. 1 illustrate s a state in which the first sensing electrode 210 and the second sensing electrode 220 are disposed in the form of a diamond. However, the embodiment is not limited thereto, and the first sensing electrode 210 and the second sensing electrode 220 may be disposed in the form of various shapes, e.g., a bar, a polygon such as a triangle and a quadrangle, a circle, a linear H shape or an ellipse.

Meanwhile, the electrode layer 200 may be disposed in the form of a mesh. At this point, the mesh shape may be randomly formed to prevent a moire phenomenon. The moire phenomenon is a pattern formed when periodic stripes are overlapped with each other and in which a thickness of each of the stripes is increased and stands out more boldly than other stripes. Therefore, to prevent such a moire phenomenon, a conductive pattern may be disposed in various shapes.

Specifically, the electrode layer 200 includes a mesh opening part OA and a mesh linear part LA. At this point, a line width of the mesh linear part LA may be 0.1 µm to 10 µm. It may be impossible to form the mesh linear part LA having a line width of 0.1 µm or less in a manufacturing process. When the line width is 10 µm or less, a pattern of the electrode layer 200 may be invisible. It is preferable that the line width of the mesh linear part LA may be 1 µm to 7 µm, and it is more preferable that the line width of the mesh linear part LA may be 2 µm to 5 µm.

Meanwhile, as illustrated in FIG. 1, the mesh opening part OA may have a quadrangular shape. However, the embodiment is not limited thereto. The mesh opening part OA may be formed by constantly disposing various shapes, e.g., a polygon such as a diamond, a pentagon and a hexagon, or a circle. That is, the mesh opening part OA may have a regular shape. However, the embodiment is not limited thereto, and the mesh opening part OA may have a random shape.

Referring to FIG. 2, a resin layer 600 and the electrode layer 200 may be disposed on the substrate 100. At this point, the electrode layer 200 may include a conductive layer 200a and a protective layer 200b. Also, the resin layer 600 may include a first pattern 610 and a second pattern 620.

The second pattern 620 is formed on the substrate 100 and disposed at the mesh linear part LA. Therefore, the second pattern 620 is disposed in the form of a mesh. The second pattern 620 may be embossed.

The first pattern 610 is formed on the substrate 100 and disposed at the mesh opening part OA. Therefore, the first pattern 610 is disposed between the second patterns 620. The first pattern 610 may be embossed.

The first pattern 610 and the second pattern 620 may include a resin or a polymer. At this point, the first pattern 610 and the second pattern 620 may be formed by an imprinting process. For example, a resin composition or a polymer is coated on the substrate 100. Then, a mold having a predetermined pattern is located above the resin composition or the polymer and imprinted thereon. The drawing illustrate s that each of the first pattern 610 and the second pattern 620 is a square protruding part. However, the present invention is not limited thereto, and a shape of the protruding part may be variously formed as needed.

The electrode layer 200 is formed on the second pattern 620 and disposed at the mesh linear part LA. Therefore, the electrode layer 200 is disposed in the form of a mesh. The drawing illustrate s that a width of the electrode layer 200 is equal to that W1 of the second pattern 620. However, the width of the electrode layer 200 may be formed to be equal to or smaller than that W1 of the second pattern 620.

The conductive layer 200a is disposed on the second pattern 620. A width W2 of the conductive layer 200a is formed smaller than that of the second pattern 620. Accordingly, the conductive layer 200a may be disposed to be in contact with only an upper surface of the second pattern 620.

That is, the conductive layer 200a is disposed at the mesh linear part LA. The conductive layer 200a is formed in the form of a mesh. The conductive layer 200a may include various metals having excellent electrical conductivity. For example, the conductive layer 200a may include chrome (Cr), copper (Cu), gold (Au), silver (Ag), aluminum (Al), titanium (Ti), nickel (Ni), molybdenum (Mo) or an alloy thereof. For example, the conductive layer 200a may be formed on the resin layer 600 in a sputtering method.

The protective layer 200b may be formed to surround an upper surface and a side surface of the conductive layer 200a. Therefore, the protective layer 200b is formed to be in contact with the upper surface and the side surface of the conductive layer 200a. That is, the protective layer 200b may be formed to surround three surfaces of the conductive layer 200a.

The protective layer 200b is disposed on the second pattern 620. Since the width W2 of the conductive layer 200a is formed smaller than that W1 of the second pattern 620, the protective layer 200b may be formed to be in contact with the upper surface of the second pattern 620.

Also, the protective layer 200b may be formed on only the second pattern 620. Therefore, the protective layer 200b may be disposed not to be in contact with a side surface of the second pattern 620 but to be spaced apart from the side surface of the second pattern 620.

The protective layer 200b may be formed to surround the upper surface and the side surface of the conductive layer 200a to prevent oxidation of the conductive layer 200a formed of a metal. Also, the protective layer 200b may prevent a light reflection due to a total reflection property of the metal forming the conductive layer 200a.

The protective layer 200b may be formed in a blackening material layer. The blackening material layer may be a black metallic oxide. For example, one selected from CuO, CrO, FeO and $Ni_2O_3$ may be applied. However, the present invention is not limited thereto, and a black material which may restrict the reflection property of the conductive layer 200a may be applied.

For example, a method of forming the electrode layer 200 is as follows. An electrode material layer is formed on a front surface of the substrate 100 including the second pattern 620 and the first pattern 610. At this point, the electrode material layer is formed on the upper surface of the second pattern 620 and an upper surface of the first pattern 610. Then, the electrode material layer is etched. At this point, a difference in a bonding area and an etching area of the electrode material layer is generated according to a structure of each of the second pattern 620 and the first pattern 610.

The bonding area between the second pattern 620 and the electrode material layer is formed larger than that between the first pattern 610 and the electrode material layer. As the etching process is performed at the same etching speed, the electrode material layer formed on the second pattern 620 remains, and the electrode material layer formed on the first pattern 610 is etched and removed. That is, the electrode material layer formed on the first pattern 610 may be lifted off and removed.

At this point, the etching process may be performed until a width of the electrode material layer formed on the second pattern 620 becomes smaller than that of the second pattern 620. Therefore, the conductive layer 200a may be formed on the second pattern 620. Then, the blackening material layer is formed and etched on the conductive layer 200a in the same method, and the protective layer 200b may be formed to surround the conductive layer 200a.

Accordingly, the electrode layer 200 disposed on the second pattern 620 and including the conductive layer 200a and the protective layer 200b may be formed. The width of the electrode layer 200 may be a distance from one side surface of protective layer 200b surrounding the conductive layer 200a to the other side surface thereof. The width of the electrode layer 200 may be formed to be equal to or smaller than that W1 of the second pattern 620.

Therefore, the conductive layer 200a and the protective layer 200b may be formed on only the second pattern 620. Also, the electrode layer 200 may be disposed in the form of the mesh. However, a method of forming the conductive layer 200a and the protective layer 200b is not limited thereto, and any method which can form the protective layer 200b to surround the upper surface and the side surface of the conductive layer 200a may be applied.

When the width W2 of the conductive layer 200a is formed to be equal to that W1 of the second pattern 620, it is difficult to realize a fine line width of the electrode layer 200 due to the width W1 of the second pattern 620. Also, when the protective layer 200b is formed on the conductive layer 200a formed to have the width equal to that W1 of the second pattern 620, the protective layer 200b may be formed to surround the second pattern 620 or to have a width larger than that W1 of the second pattern 620. That is, there is a problem that the width of the electrode layer 200 is formed larger than that W1 of the second pattern 620.

Therefore, in the touch window according to the embodiment, since the width of the conductive layer 200a is formed smaller than that of the second pattern 620 and the width of the electrode layer 200 is formed to be equal to or smaller than that of the second pattern 620, the fine line width may be realized, regardless of the width W1 of the second pattern 620. Therefore, the touch window according to the embodiment may have enhanced optical characteristics such as visibility and transmittance.

Although not illustrated in the drawings, the touch window according to the embodiment may further include a cover substrate disposed on the substrate 100 on which the electrode layer 200 is formed. That is, the cover substrate may be disposed on the substrate 100 on which the electrode layer 200 and so on are formed.

A transparent adhesive layer may be formed between the substrate 100 and the cover substrate. For example, the transparent adhesive layer may include an optically clear adhesive (OCA) or an optically clear resin (OCR).

Hereinafter, the touch window according to the first embodiment will be described with reference to FIG. 3. Description overlapped with the above-described embodiment may be omitted, and like reference numerals refer to like or corresponding elements.

Referring to FIG. 3, a substrate 100 in which an available area and an unavailable area disposed around the available area are defined is provided. A resin layer 600 is formed on the substrate 100, and an electrode layer 200 is formed at the available area of the substrate 100.

At this point, the resin layer 600 may include a first pattern 610 and a second pattern 620. Furthermore, the electrode layer 200 may include a conductive layer 200a and a protective layer 200b. Also, the protective layer 200b may include a first protective layer 201b and a second protective layer 202b.

The first protective layer 201b may be formed to surround the conductive layer 200a. For example, the first protective layer 201b may be formed to surround the upper surface and the side surface of the conductive layer 200a. That is, the first protective layer 201b may be formed to surround an exposed front surface of the conductive layer 200a.

Also, the second protective layer 202b may be disposed to be in contact with a lower surface of the conductive layer 200a. The second protective layer 202b may enhance an adhesion force of the conductive layer 200a. That is, the protective layer 200b may be formed to surround the front surface of the conductive layer 200a formed of a metal. Therefore, the oxidation may be prevented, and the reflection due to the total reflection property of the metal may be prevented.

At this point, the first protective layer 201b and the second protective layer 202b may be formed of the same material. For example, the first protective layer 201b and the second protective layer 202b may be formed in a blackening material layer. The blackening material layer may be a black metallic oxide. For example, one selected from CuO, CrO, FeO and $Ni_2O_3$ may be applied. However, the present invention is not limited thereto, and a black-based material which may restrict the reflection property of the conductive layer 200a may be applied.

For example, a method of forming the electrode layer 200 is as follows. A first blackening material layer is formed on the front surface of the substrate 100 including the first pattern 610 and the second pattern 620. At this point, the first blackening material layer is formed on an upper surface of the first pattern 610 and an upper surface of the second pattern 620.

Then, the first blackening material layer is etched. A difference in a bonding area and an etching area of the first blackening material layer is generated according to a structure of each of the first pattern 610 and the second pattern 620. Accordingly, the first blackening material layer formed on the first pattern 610 is lifted off and removed, and the first blackening material layer formed on the second pattern 620 remains. That is, a first blackening material pattern is formed on only the second pattern 620.

Then, an electrode material layer is formed on the front surface of the substrate 100 on which the first blackening material pattern is formed. The electrode material layer is formed on the upper surface of the second pattern 620 and the upper surface of the first pattern 610, and the electrode material layer formed on the first pattern 610 is etched. Therefore, the electrode material layer formed on the second pattern 620 and the first blackening material pattern becomes the conductive layer 200a. That is, the first blackening material pattern is formed to be in contact with the lower surface of the conductive layer 200a.

At this point, a width of the conductive layer 200a is formed smaller than that of the second pattern 620. That is, a distal end of the second pattern 620 is formed at an outer side further than a distal end of the conductive layer 200a.

Then, a second blackening material layer is formed on the front surface of the substrate 100 on which the conductive layer 200a is formed. Since the width of the conductive layer 200a is formed smaller than that of the second pattern 620, the second blackening material layer formed on the second pattern 620 is formed to surround the conductive layer 200a. That is, the second blackening material layer formed on the second pattern 620 is formed to be in contact with the upper surface and the side surface of the conductive layer 200a.

Then, the second blackening material layer is etched. The second blackening material layer formed on the upper surface of the first pattern 610 is removed, and the second blackening material layer formed on the upper surface of the second pattern 620 remains. Therefore, a second blackening material pattern formed to surround the upper surface and the side surface of the conductive layer 200a is formed. Thus, the second blackening material pattern formed on the upper surface and the side surface of the conductive layer 200a may be integrally connected to the first blackening material pattern formed on the lower surface of the conductive layer 200a. That is, the protective layer 200b in which the first protective layer 201b and the second protective layer 202b are integrally connected may be formed. In other words, the protective layer 200b may be formed to surround the front surface of the electrode layer 200.

However, a method of forming the conductive layer 200a and the protective layer 200b is not limited thereto, and any methods which can form the protective layer 200b to surround four surfaces of the conductive layer 200a may be applied.

Although not illustrated in the drawings, the touch window according to the embodiment may further include a cover substrate disposed on the substrate 100 on which the electrode layer 200 is formed. That is, the cover substrate may be disposed on the substrate 100 on which the electrode layer 200 and so on are formed.

A transparent adhesive layer may be formed between the substrate 100 and the cover substrate. For example, the transparent adhesive layer may include an optically clear adhesive (OCA) or an optically clear resin (OCR).

Hereinafter, a touch window according to a second embodiment will be described with reference to FIGS. 4 to 10. Description overlapped with the above-described first embodiment may be omitted, and like reference numerals refer to like or corresponding elements.

Referring to FIGS. 4 to 10, the touch window according to the second embodiment may include a substrate 100, an electrode layer 200 and a printed circuit board 350.

The electrode layer 200, the printed circuit board 350 and so on may be disposed on the substrate 100. That is, the substrate 100 may be a support substrate.

The substrate 100 may include a cover substrate. That is, the electrode layer 200 and the printed circuit board 350 may be supported by the cover substrate. Alternatively, a separate cover substrate may be further disposed on the substrate 100. That is, the electrode layer 200 and the printed circuit board 350 may be supported by the substrate 100, and the substrate 100 and the cover substrate may be bonded through an adhesive layer.

The electrode layer 200 may include a first sensing electrode 210, a second sensing electrode 220 and a wired electrode 300.

The first sensing electrode 210 and the second sensing electrode 220 may be disposed on the substrate 100. Specifically, the first sensing electrode 210 and the second sensing electrode 220 may be disposed in at least one of an active area AA and an inactive area UA of the substrate 100. Preferably, the first sensing electrode 210 and the second sensing electrode 220 may be disposed at the active area AA of the substrate 100.

The first sensing electrode 210 and the second sensing electrode 220 may be disposed on one surface of the substrate 100. Specifically, the first sensing electrode 210 and the second sensing electrode 220 may be disposed on the same surface of the substrate 100. That is, the first sensing electrode 210 and the second sensing electrode 220 may be disposed on the same surface of the substrate 100 not to be in contact with each other but to be spaced apart from each other. Also, the first sensing electrode 210 and the second sensing electrode 220 may be disposed to be in direct or indirect contact with the substrate 100.

At least one sensing electrode of the first sensing electrode 210 and the second sensing electrode 220 may include a transparent conductive material to allow electricity to flow while not obstructing light transmission. For example, the at least one sensing electrode of the first sensing electrode 210 and the second sensing electrode 220 may include a metallic oxide such as an indium tin oxide, an indium zinc oxide, a copper oxide, a tin oxide, a zinc oxide and a titanium oxide.

Alternatively, the at least one sensing electrode of the first sensing electrode 210 and the second sensing electrode 220 may include a nanowire, a photosensitive nanowire film, a carbon nanotube (CNT), a graphene, a conductive polymer or a mixture thereof.

Alternatively, the at least one sensing electrode of the first sensing electrode 210 and the second sensing electrode 220 may include various metals. For example, the at least one sensing electrode of the first sensing electrode 210 and the second sensing electrode 220 may include at least one of chrome (Cr), nickel (Ni), copper (Cu), aluminum (Al), silver (Ag), molybdenum (Mo), gold (Au), titanium (Ti) and an alloy thereof.

The first sensing electrode 210 and the second sensing electrode 220 may include a mesh shape. Specifically, the first sensing electrode 210 and the second sensing electrode 220 may include a plurality of sub-electrodes, and the sub-electrodes may be disposed to intersect with each other in the form of a mesh and may be generally formed in a mesh electrode.

Figure 5:
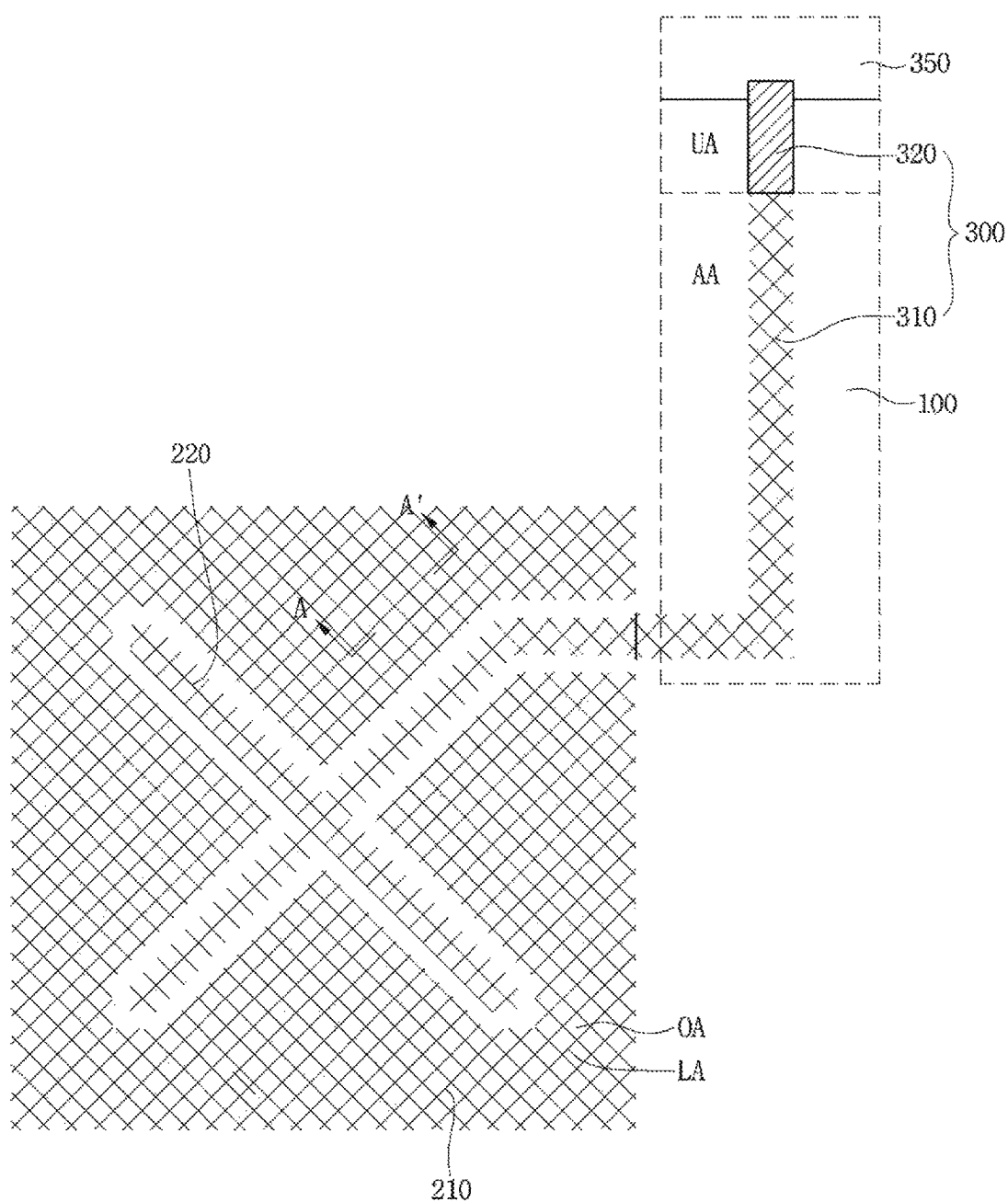
FIG. 5 is an enlarged view of one area of FIG. 4.

Specifically, referring to FIG. 5, the first sensing electrode 210 and the second sensing electrode 220 may include a mesh line LA and a mesh opening part OA between the mesh lines LA, which are formed by the plurality of sub-electrodes formed to intersect with each other in the form of the mesh. At this point, a width of the mesh line LA may be about 0.1 μm to about 10 μm. It may be impossible to form the mesh linear LA having a line width less than 0.1 μm in a manufacturing process. When the line width is more than 10 μm, a sensing electrode pattern may be visible from an outside, and visibility may be lowered. Alternatively, the width of the mesh line LA may be about 1 μm to about 5 μm. Alternatively, the width of the mesh line LA may be about 1.5 μm to about 3 μm.

The mesh opening part OA may be formed in various shapes. Also, the mesh opening part OA may be formed in a regular shape or a random shape.

Since the sensing electrode is formed in the mesh shape, a pattern of the sensing electrode may be invisible on the active area AA or the inactive area UA. That is, even when the sensing electrode is formed of a metal, the pattern thereof may be invisible. Also, even when the sensing electrode is applied to a large-sized touch window, it is possible to reduce resistance of the touch window.

The wired electrode 300 may be disposed on the substrate 100. Specifically, the wired electrode 300 may be disposed on the same plane together with the first sensing electrode 210 and the second sensing electrode 220.

The wired electrode 300 may be disposed at on least one of the active area AA and the inactive area UA of the substrate 100. For example, the wired electrode 300 may be disposed at the active area AA and the inactive area UA of the substrate 100.

Figure 4:
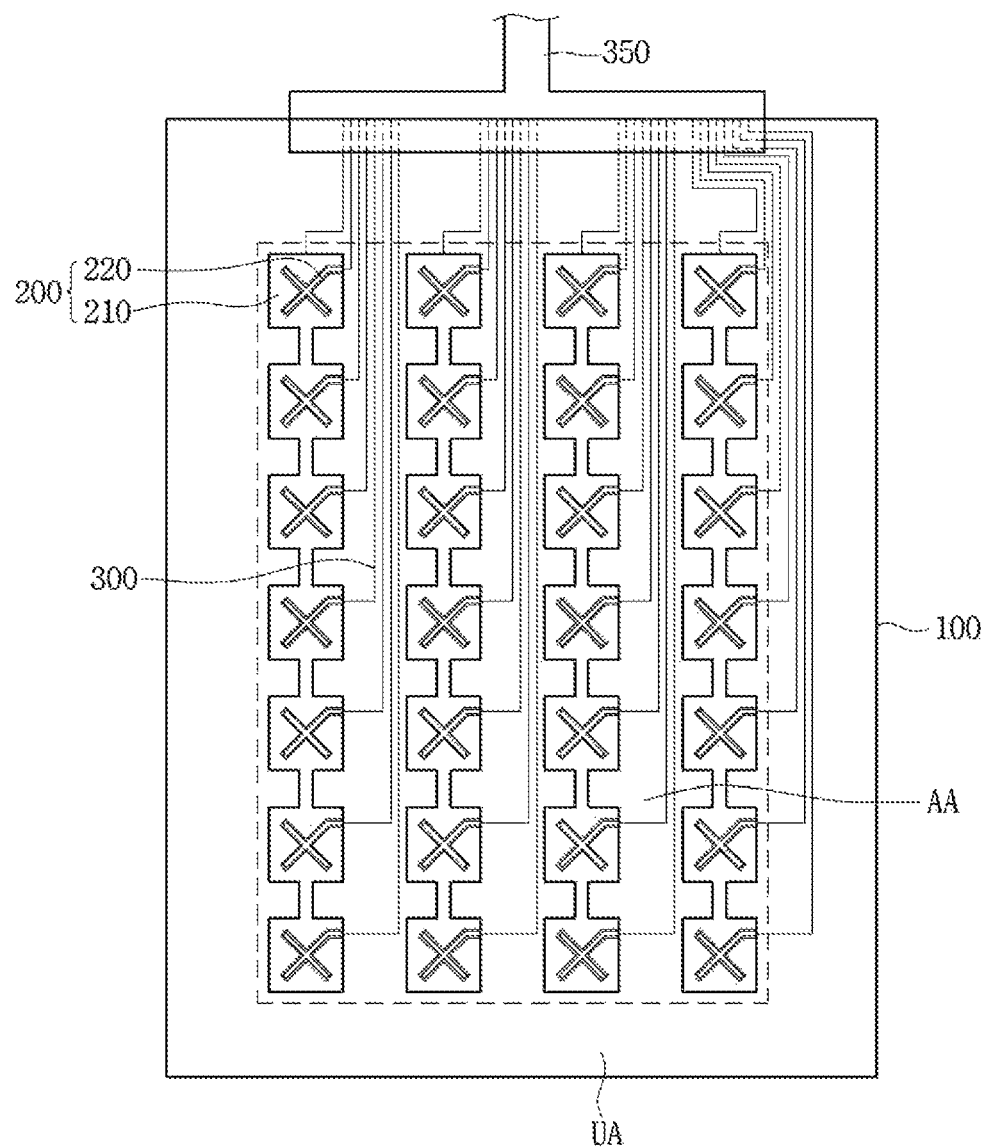
FIG. 4 is a plan view of a touch window according to second, third and fourth embodiments of the present invention.

Referring to FIG. 4, the wired electrode 300 may be disposed to extend from the active area AA toward the inactive area UA. Specifically, the wired electrode 300 may be connected to the first sensing electrode 210 and the second sensing electrode 220 at the active area AA. And the wired electrode 300 may be connected to the printed circuit board 350 at the inactive area UA.

The printed circuit board 350 may be disposed in at least one of the active area AA and the inactive area UA of the substrate 100.

The printed circuit board 350 may include a driving chip. Therefore, a touch signal sensed from the first sensing electrode 210 and the second sensing electrode 220 may be transmitted through the wired electrode 300. The touch signal may be transmitted to the driving chip.

The wired electrode 300 may include a material which is the same as or similar to that of the first sensing electrode 210 and the second sensing electrode 220. Also, the wired electrode 300 may include a mesh shape, like the sensing electrode.

Referring to FIGS. 4 and 5, the wired electrode 300 may include a first wired electrode 310 disposed on the active area AA and a second wired electrode 320 disposed on the inactive area UA. At least one of the first wired electrode 310 and the second wired electrode 320 may include a mesh shape. For example, the first wired electrode 310 is disposed in the form of the mesh by a plurality of sub-electrodes intersecting with each other, and the second wired electrode 320 may be disposed in the form of a bulk wire. However, the embodiment is not limited thereto, and both of the first wired electrode 310 and the second wired electrode 320 may be formed in the mesh shape, or both of the first wired electrode 310 and the second wired electrode 320 may be formed in the bulk wire.

Also, the first wired electrode 310 and the second electrode 320 may be integrally formed.

Figure 6:
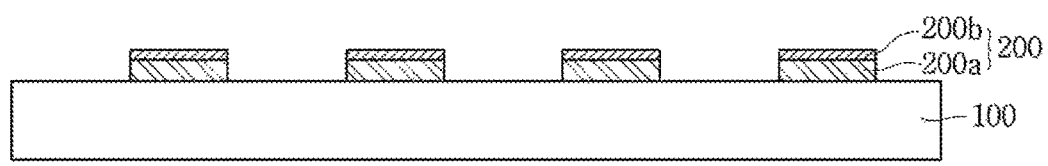
FIGS. 6 to 8 are cross-sectional views taken by cutting A-A' area of FIG. 5 according to the second, third and fourth embodiments of the present invention.
Figure 7:
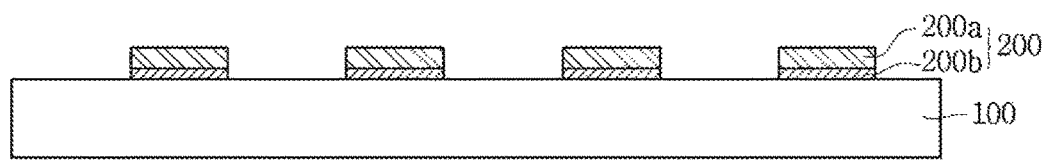
Figure 8:
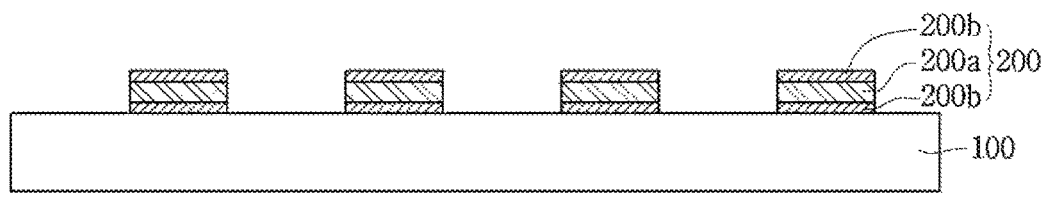

FIGS. 6 to 8 are views illustrating one cross section of the electrode layer of the touch window according to the second embodiment of the present invention. FIGS. 6 to 8 illustrate the sensing electrode. However, in the below description, the electrode layer may also include the wired electrode other than the sensing electrode.

Referring to FIGS. 6 to 8, the electrode layer 200 may be disposed on the substrate 100. The electrode layer 200 may include a conductive layer 200a, i.e., the sensing electrode and a protective layer 200b on the sensing electrode.

The protective layer 200b may be disposed on at least one of one surface and the other surface of the conductive layer 200a.

Referring to FIG. 6, the protective layer 200b may be disposed on an upper surface of the conductive layer 200a. The protective layer 200b may be disposed on the upper surface of the conductive layer 200a and may be in direct or indirect contact with the conductive layer 200a. Specifically, the conductive layer 200a may include one surface which is in contact with the substrate 100 and the other surface opposite to the one surface, and the protective layer 200b may be disposed on the other surface of the conductive layer 200a.

Each of the conductive layer 200a and the protective layer 200b may include the same material or similar materials. For example, the conductive layer 200a and the protective layer 200b may include conductive materials corresponding to each other. For example, the conductive layer 200a and the protective layer 200b may include metals corresponding to each other.

The protective layer 200b may be disposed in a nanometer size (nm). The protective layer 200b may be disposed to have a thickness which is the same as or similar to that of the conductive layer 200a. Alternatively, the protective layer 200b may be disposed to have a thickness different from that of the conductive layer 200a.

The protective layer 200b may be a compound. For example, the protective layer 200b may include a metal nitride compound including nitrogen N and a metal (hereinafter, referred to as M). For example, the protective layer 200b may be indicated by a chemical formula of $M_xN_y$ (wherein, $0<x\leq1$, $0<y\leq1$). Alternatively, the protective layer 200b may include a metal nitride oxide including nitrogen, a metal and oxygen. For example, the protective layer 200b may be indicated by a chemical formula of $M_xN_yO_z$ (wherein, $0<x\leq1$, $0<y\leq1$, $0<z\leq1$).

The protective layer 200b may include a predetermined amount of nitrogen. For example, the protective layer 200b may include 1.3 weight % or more of nitrogen with respect to 100 weight % of the metal nitride compound. Specifically, the protective layer 200b may include about 1.3 weight % to about 10 weight % of nitrogen with respect to 100 weight % of the metal nitride compound. More specifically, the protective layer 200b may include about 1.3 weight % to about 4 weight % of nitrogen with respect to 100 weight % of the metal nitride compound.

Alternatively, assuming that a content of the nitrogen and the metal included in the metal nitride oxide, i.e., a content of a metal nitride is 100 weight %, the protective layer 200b may include about 1.3 weight % or more of nitrogen with respect to 100 weight % of the metal nitride. Specifically, the protective layer 200b may include about 1.3 weight % to about 10 weight % of nitrogen with respect to 100 weight % of the metal nitride. More specifically, the protective layer 200b may include about 1.3 weight % to about 4 weight % of nitrogen with respect to 100 weight % of the metal nitride.

When the nitrogen content of the protective layer 200b is less than about 1.3 weight %, visibility and conductivity may be degraded according to a change in a color of the protective layer 200b. Also, when the nitrogen content of the protective layer 200b is more than about 10 weight %, process efficiency may be deteriorated.

The protective layer 200b may have a color. For example, the protective layer 200b may have a black-based color. For example, the protective layer 200b may have the black-based color such as a black color and a black-mixed color in which the black color is mixed with another color like a white color.

The protective layer 200b may be disposed on the conductive layer 200a to protect the sensing electrode from permeation of foreign substances or the like. For example, the protective layer 200b may be disposed on one surface of the sensing electrode to protect the sensing electrode from the foreign substances, thereby preventing the sensing electrode from being corroded or damaged. Also, the sensing electrode may be prevented from being corroded and discolored such that the discolored sensing electrode is not visible from an outside. That is, the protective layer 200b may be an electrode protective layer.

Also, the protective layer 200b may include a black-based color. Therefore, when the sensing electrode is formed of a material like a metal, the sensing electrode may be prevented from being visible from an outside due to the glittering characteristic of a metal. That is, the protective layer 200b may be a reflection preventing layer.

Referring to FIGS. 7 and 8, the protective layer 200b may be disposed on other surface of the conductive layer 200a.

Referring to FIG. 7, the protective layer 200b may be disposed on a lower surface of the conductive layer 200a. For example, the protective layer 200b may be disposed on the lower surface of the conductive layer 200a and may be in direct or indirect contact with the conductive layer 200a.

Alternatively, referring to FIG. 8, the protective layer 200b may be disposed on the upper surface and the lower surface of the conductive layer 200a. For example, the protective layer 200b may be disposed on the upper surface and the lower surface of the conductive layer 200a and may be in direct or indirect contact with the conductive layer 200a.

Alternatively, although not illustrated in the drawings, the protective layer 200b may be disposed on at least one of side surfaces of the conductive layer 200a.

Figure 9:
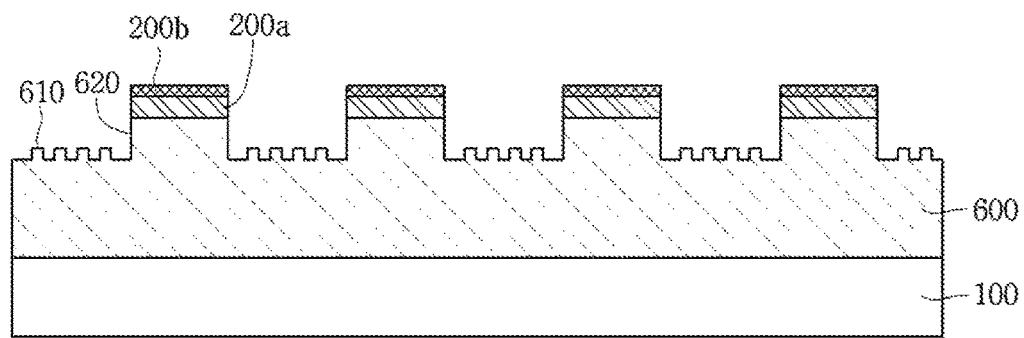
FIGS. 9 and 10 are other cross-sectional views taken by cutting the A-A' area of FIG. 5 according to the second, third and fourth embodiments of the present invention.
Figure 10:
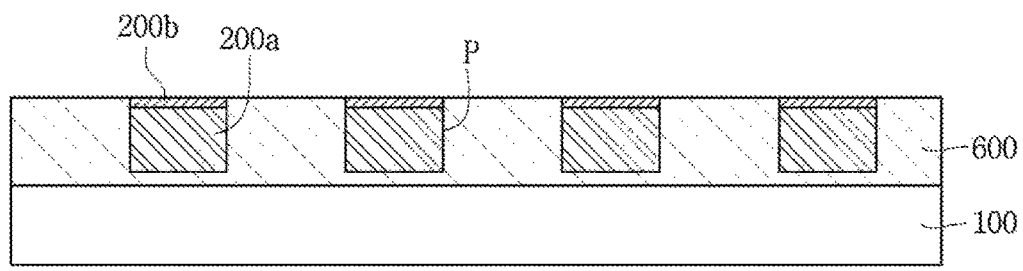

FIGS. 9 and 10 are views illustrating one cross section of the electrode layer of the touch window according to the second embodiment of the present invention. FIGS. 9 and 10 illustrate the sensing electrode. However, in the below description, the electrode layer may also include the wired electrode other than the sensing electrode.

Referring to FIGS. 9 and 10, the touch window according to the second embodiment may further include a middle layer, i.e., a resin layer 600 disposed on the substrate 100.

Referring to FIG. 9, the resin layer 600 may include a first pattern 610 and a second pattern 620. The first pattern 610 and the second pattern 620 may have sizes different from each other. Specifically, the second pattern 620 may have a size larger than that of the first pattern 610. For example, a width of the first pattern 610 may have a nanometer size (nm), and a width of the second pattern 620 may have a micrometer size (μm).

The conductive layer 200a may be disposed on the second pattern 620. For example, a conductive material forming the conductive layer 200a is disposed on both of the first pattern 610 and the second pattern 620, and then the conductive material is allowed to remain on only the second pattern 620 due to a difference of an etching speed according to a difference between a bonding area of the conductive material and the first pattern 610 and a bonding area of the conductive material and the second pattern 620 when performing an etching process, and thus the conductive layer 200a is allowed to remain on only the second pattern 620.

The above-described protective layer 200b may be disposed on the conductive layer 200a. FIG. 9 illustrate s a state in which the protective layer 200b is disposed on only the upper surface of the conductive layer 200a. However, the embodiment is not limited thereto, and the protective layer 200b may be disposed on at least one of the upper surface, the lower surface and the side surface of the conductive layer 200a.

Referring to FIG. 10, the resin layer 600 may include a pattern P. For example, the resin layer 600 may include an intaglio pattern.

The conductive layer 200a may be disposed on the pattern P. For example, the conductive layer 200a may be disposed inside the intaglio pattern.

The above-described protective layer 200b may be disposed on the conductive layer 200a. FIG. 10 illustrate s a state in which the protective layer 200b is disposed on only the upper surface of the conductive layer 200a. However, the embodiment is not limited thereto, and the protective layer 200b may be disposed on at least one of the upper surface, the lower surface and the side surface of the conductive layer 200a.

Hereinafter, the present invention will be described through examples and comparative examples in more detail. The examples are provided merely to explain the present invention in more detail. Therefore, the present invention is not limited to the examples.

Examples and Comparative Examples

A copper (Cu) layer was formed on a polycarbonate (PC) substrate using a sputtering apparatus. The copper layer was formed in an argon (Ar) environment using a copper target while the sputtering apparatus is set to 0.5 rpm, a pressure of 3 mTorr and 1500 W.

Then, while the rpm, pressure and electric power of the sputtering apparatus were set as provided in Table 1, and a flow rate of each of argon (Ar), oxygen ($O_2$) and nitrogen ($N_2$) was also set as provided in Table 1, a protective layer was deposited.

And a color E1 of the protective layer was measured at room temperature, and the protective layer was put in a chamber having a temperature of about 105° C. for about 72 hours and then taken out of the chamber, and a color E2 of the protective layer was measured. Then, a color change ΔE (ΔE=E1−E2) of the protective layer was measured.

TABLE 1

| | | Sputtering conditions | | | | | |
| | rpm | Pressure (mTorr) | Power (W) | Argon content (sscm) | Oxygen content (sscm) | Nitrogen content (sscm) | Nitrogen content with respect to copper (weight %) | ΔE |
|---|---|---|---|---|---|---|---|---|
| Example 1 | 0.5 | 3 | 2000 | 50 | 20 | 20 | 1.3 | 7.94 |
| Example 2 | 0.5 | 3 | 2000 | 75 | 20 | 20 | 2.5 | 4.67 |
| Example 3 | 0.5 | 3 | 2000 | 100 | 20 | 20 | 3.1 | 1.24 |
| Example 4 | 0.5 | 3 | 2000 | 100 | 20 | 40 | 3.5 | 7.39 |
| Comparative Example1 | 0.5 | 8 | 1500 | 105 | 35 | 35 | 0.89 | 35.84 |
| Comparative Example2 | 0.5 | 3 | 2000 | 100 | 40 | 20 | 0.56 | 22.39 |

Referring to Table 1, it may be understood that, assuming that the sum of the nitrogen content and the copper content is 100 weight %, the nitrogen content in Example 1 to Example 4 is 1.3 weight % or more. Also, it may be understood that the color change of the protective layer in Example 1 to Example 4 is small.

Also, it may be understood that, assuming that the sum of the nitrogen content and the copper content is 100 weight %, the nitrogen content in Comparative Example 1 and Comparative Example 2 is less than 1.3 weight %. Also, it may be understood that the color change of the protective layer in Comparative Example 1 and Comparative Example 2 is large.

That is, in the case of Example 1 to Example 4, it may be understood that, as the nitrogen content with respect to the copper is 1.3 weight % or more, the color change of the protective layer is minimized. That is, in the case of Example 1 to Example 4, deformation of the protective layer may be minimized even though the protective layer is exposed to a high temperature.

However, in the case of Comparative Example 1 and Comparative Example 2, it may be understood that, as the nitrogen content with respect to the copper is less than 1.3 weight %, the color change of the protective layer is increased. That is, in the case of Comparative Example 1 and Comparative Example 2, it may be understood that the deformation of the protective layer becomes larger when the protective layer is exposed to a high temperature.

Accordingly, the color change of the protective layer may be minimized by controlling the nitrogen content of the protective layer, and thus the electrode layer may be easily protected by preventing the deformation and the corrosion of the protective layer, and the visibility of the touch window may be enhanced by preventing the electrode layer from being visible according to the color change.

Hereinafter, a touch window according to a third embodiment will be described with reference to FIGS. 6 to 10. Description overlapped with the above-described embodiment may be omitted, and like reference numerals refer to like or corresponding elements.

FIGS. 6 to 8 are views illustrating one cross section of an electrode layer of the touch window according to the third embodiment of the present invention. FIGS. 6 to 8 illustrate a sensing electrode. However, the embodiment is not limited thereto, and in the below description, the electrode layer may also include a wired electrode other than the sensing electrode.

Referring to FIGS. 6 to 8, the electrode layer 200 may be disposed on the substrate 100. The electrode layer 200 may include a conductive layer 200a and a protective layer 200b.

Also, the conductive layer 200a may be disposed to be in direct or indirect contact with the substrate 100.

The protective layer 200b may be disposed on at least one of one surface and the other surface of the conductive layer 200a. For example, the protective layer may be disposed to be in contact with at least one surface of the conductive layer 200a.

Referring to FIG. 6, the protective layer 200b may be disposed on an upper surface of the conductive layer 200a. The protective layer 200b may be disposed on the upper surface of the conductive layer 200a and may be in direct or indirect contact with the conductive layer 200a. Specifically, the conductive layer 200a may include one surface which is in contact with the substrate 100 and the other surface opposite to the one surface, and the protective layer 200b may be disposed on the other surface of the conductive layer 200a.

The conductive layer 200a and the protective layer 200b may include metal layers different from each other.

Also, the conductive layer 200a and the protective layer 200b may include conductive materials having different resistance from each other.

The conductive layer 200a and the protective layer 200b may be metal layers having different lattice constants from each other.

For example, the conductive layer 200a may include at least one of chrome (Cr), nickel (Ni), copper (Cu), aluminum (Al), silver (Ag), molybdenum (Mo), gold (Au), titanium (Ti) and an alloy thereof. Specifically, the conductive layer 200a may include copper (Cu).

For example, the protective layer may include niobium (Nb). However, the embodiment is not limited thereto, and a black-based material which may prevent oxidation of the conductive layer 200a and may restrict a reflection property thereof may be applied.

The protective layer 200b may have a color. For example, the protective layer 200b may include a black-based color. For example, the protective layer 200b may have the black-based color such as a black color and a black-mixed color in which the black color is mixed with another color like a white color.

The protective layer 200b may be disposed on the conductive layer 200a to protect the conductive layer 200a from permeation of foreign substances or the like. For example, the protective layer 200b may be disposed on one surface of the conductive layer 200a to protect the conductive layer 200a from the foreign substances, thereby preventing the conductive layer 200a from being corroded or damaged.

That is, the protective layer 200b may prevent the conductive layer 200a from being corroded and discolored such that the discolored conductive layer 200a is not visible from an outside. For example, the protective layer 200b may be an oxidation preventing layer of the conductive layer 200a.

Also, the protective layer 200b may include a black-based color. Accordingly, when the conductive layer 200a is formed of a material like a metal, the conductive layer 200a may be prevented from being visible from an outside due to the glittering characteristic of a metal. That is, the protective layer 200b may be a reflection preventing layer.

Also, the protective layer 200b may have conductivity. That is, the electrode layer 200 may include the conductive layer 200a and the protective layer 200b, and the protective layer 200b may have the conductivity and the black-based color.

The conductive layer 200a and the protective layer 200b may have different thicknesses from each other. Specifically, the thickness of the conductive layer 200a may be greater than that of the protective layer 200b.

For example, the thickness of the conductive layer 200a may be about 100 nm to about 500 nm. Specifically, the thickness of the conductive layer 200a may be about 150 nm to about 250 nm. More specifically, the thickness of the conductive layer 200a may be about 180 nm to about 200 nm.

When the thickness of the conductive layer 200a is more than about 500 nm, a thickness of the touch window may be increased.

For example, the thickness of the protective layer 200b may be about 1 nm to about 30 nm. Specifically, the thickness of the protective layer 200b may be about 10 nm to about 30 nm. More specifically, the thickness of the protective layer 200b may be about 20 nm to about 30 nm.

When the thickness of the protective layer 200b is less than about 1 nm, the oxidation preventing and/or reflection preventing properties of the conductive layer 200a may be degraded.

When the thickness of the protective layer 200b is more than about 30 nm, the protective layer 200b becomes thicker, and thus an etching defect may occur.

Referring to FIGS. 7 and 8, the protective layer 200b may be disposed on the other surface of the conductive layer 200a.

Referring to FIG. 7, the protective layer 200b may be disposed on a lower surface of the conductive layer 200a. For example, the protective layer 200b may be disposed on the lower surface of the conductive layer 200a and may be in direct or indirect contact with the conductive layer 200a.

Alternatively, referring to FIG. 8, the protective layer 200b may be disposed on the upper surface and the lower surface of the conductive layer 200a. For example, the protective layer 200b may be disposed on the upper surface and the lower surface of the conductive layer 200a and may be in direct or indirect contact with the conductive layer 200a.

Alternatively, although not illustrated in the drawings, the protective layer 200b may be disposed on at least one of side surfaces of the conductive layer 200a.

FIGS. 9 and 10 are views illustrating one cross section of the electrode layer of the touch window according to the third embodiment of the present invention. FIGS. 9 and 10 illustrate the sensing electrode. However, in the below description, the electrode layer may also include the wired electrode other than the sensing electrode.

Referring to FIGS. 9 and 10, the touch window according to the third embodiment may further include a middle layer, i.e., a resin layer 600 disposed on the substrate 100.

Referring to FIG. 9, the conductive layer 200a may be disposed on the second pattern 620. The above-described protective layer 200b may be disposed on the conductive layer 200a. FIG. 9 illustrate s a state in which the protective layer 200b is disposed on only the upper surface of the conductive layer 200a. However, the embodiment is not limited thereto, and the protective layer 200b may be disposed on at least one of the upper surface, the lower surface and the side surface of the conductive layer 200a.

Referring to FIG. 10, the resin layer 600 may include a pattern P. For example, the resin layer 600 may include an intaglio pattern.

The conductive layer 200a may be disposed on the pattern P. For example, the conductive layer 200a may be disposed inside the intaglio pattern.

The above-described protective layer 200b may be disposed on the conductive layer 200a. FIG. 10 illustrate s a state in which the protective layer 200b is disposed on only the upper surface of the conductive layer 200a. However, the embodiment is not limited thereto, and the protective layer 200b may be disposed on at least one of the upper surface, the lower surface and the side surface of the conductive layer 200a.

In the touch window according to the third embodiment, since the protective layer 200b is disposed on at least one of one surface and the other surface of the conductive layer 200a, oxidation of the conductive layer 200a may be prevented. Also, the reflection of the conductive layer 200a due to a total reflection property thereof may be prevented. Therefore, the touch window according to the third embodiment may have enhanced reliability and visibility.

Hereinafter, another touch window according to a fourth embodiment will be described with reference to FIGS. 11 to 15.

Figure 11:
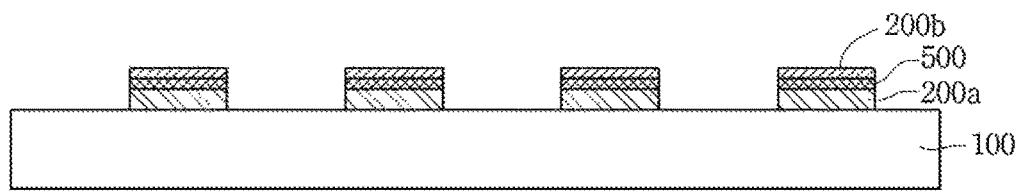
FIGS. 11 to 13 are cross-sectional views taken by cutting the A-A' area of FIG. 5 according to the fourth embodiment of the present invention.
Figure 13:
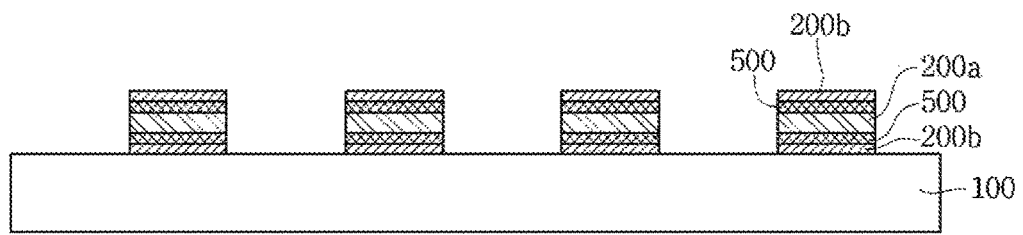

FIGS. 11 and 13 are views illustrating one cross section of an electrode layer of another touch window according to the fourth embodiment of the present invention. FIGS. 11 and 13 illustrate a sensing electrode. However, the embodiment is not limited thereto, and in the below description, the electrode layer may also include a wired electrode other than the sensing electrode.

Figure 12:
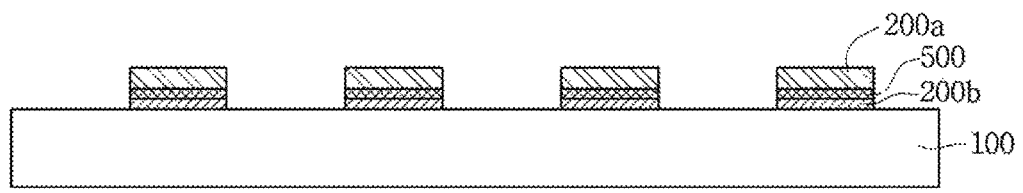

Referring to FIGS. 11 to 13, an electrode layer 200 and a buffer layer 500 may be disposed on the substrate 100. The electrode layer 200 may include a conductive layer 200a and a protective layer 200b.

Also, one surface of the buffer layer 500 may be disposed to be in contact with the conductive layer 200a, and the other surface thereof opposite to the one surface may be disposed to be in contact with the protective layer 200b.

Referring to FIG. 11, the protective layer 200b may be disposed on an upper surface of the conductive layer 200a. The protective layer 200b may be disposed on the upper surface of the conductive layer 200a, and the buffer layer 500 may be disposed between the conductive layer 200a and the protective layer 200b. Specifically, the conductive layer 200a may include one surface which is in contact with the substrate 100 and the other surface opposite to the one surface, and the protective layer 200b may be disposed on the other surface of the conductive layer 200a.

For example, the buffer layer 500 may be disposed to be in direct contact with the other surface of the conductive layer 200a, and the protective layer 200b may be disposed to be in indirect contact therewith.

For example, the conductive layer 200a and the protective layer 200b may include a material which is the same as or similar to that in the third embodiment.

The buffer layer 500 may include an oxide.

The buffer layer 500 may include a metal oxide. For example, the buffer layer 500 may be an oxide including the same metal as that of the conductive layer 200a.

The buffer layer 500 may be an oxide including a material different from that of the conductive layer 200a. For example, the buffer layer 500 may include silicon dioxide.

Lattice constants of the conductive layer 200a, the protective layer 200b and the buffer layer 500 may be different from one another. For example, the lattice constant of the buffer layer 500 may have a value between the lattice constant of the conductive layer 200a and the lattice constant of the protective layer 200b and thus may relieve a stress between the conductive layer 200a and the protective layer 200b.

That is, the buffer layer 500 having the value between the lattice constant of the conductive layer 200a and the lattice constant of the protective layer 200b is disposed between the conductive layer 200a and the protective layer 200b, and thus the stress generated at a contact interface of the conductive layer 200a and the protective layer 200b may be relieved.

For example, when the conductive layer 200a is disposed on the substrate 100 and the protective layer 200b is disposed on the conductive layer 200a, films of the conductive layer 200a and the protective layer 200b may be removed due to the different materials from each other and a difference between crystal lattices, and as the stress is also increased, a bending phenomenon may be generated at the substrate 100 and/or the electrode layer 200.

The buffer layer 500 may be a stress relieving layer or a stress dispersion layer. That is, the buffer layer 500 may relieve the stress generated at the contact interface between the conductive layer 200a and the protective layer 200b which are formed of the different materials. Therefore, deformation of the substrate 100 and/or the electrode layer 200 may be prevented.

For example, the deformation of the substrate 100 and/or the electrode layer 200 generated by disposing the electrode layer on a flexible substrate may be prevented.

Specifically, the substrate 100 may be prevented from being contracted or curled. Also, hillocks or wrinkles may be prevented from being generated on a surface of the electrode layer 200.

The conductive layer 200a, the protective layer 200b and the buffer layer 500 may have different thicknesses from one another. The thickness of the conductive layer 200a may be greater than that of the protective layer 200b. The thickness of the conductive layer 200a may be greater than that of the buffer layer 500.

For example, the thickness of the protective layer 200b may be greater than that of the buffer layer 500.

For example, the thicknesses of the conductive layer 200a and the protective layer 200b may be the same as or similar to those in the first embodiment.

For example, the thickness of the buffer layer 500 may be about 1 nm to 30 nm. Specifically, the thickness of the buffer layer 500 may be about 1 nm to 20 nm. More specifically, the thickness of the buffer layer 500 may be about 10 nm to 20 nm.

When the thickness of the buffer layer 500 is less than about 1 nm, the substrate 100 may be bent or rolled, and thus it is difficult to uniformly form the electrode layer 200.

When the thickness of the buffer layer 500 is more than about 30 nm, an electrical characteristic of the touch window may be degraded.

Referring to FIGS. 12 and 13, the protective layer 200b may be disposed on the other surface of the conductive layer 200a.

Referring to FIG. 12, the protective layer 200b may be disposed on a lower surface of the conductive layer 200a. For example, the protective layer 200b may be disposed on the lower surface of the conductive layer 200a, and the buffer layer 500 may be disposed between the conductive layer 200a and the protective layer 200b.

Alternatively, referring to FIG. 13, the protective layer 200b may be disposed on the upper surface and the lower surface of the conductive layer 200a. For example, the protective layer 200b may be disposed on the upper surface and the lower surface of the conductive layer 200a, and the buffer layer 500 may be disposed between the conductive layer 200a and the protective layer 200b.

Alternatively, although not illustrated in the drawings, the protective layer 200b may be disposed on at least one of side surfaces of the conductive layer 200a.

Figure 14:
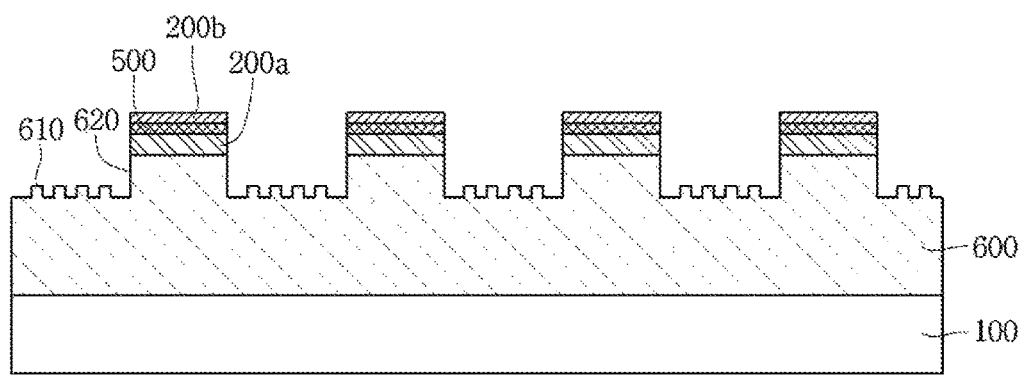
FIGS. 14 and 15 are other cross-sectional views taken by cutting the A-A' area of FIG. 5 according to the fourth embodiment of the present invention.
Figure 15:
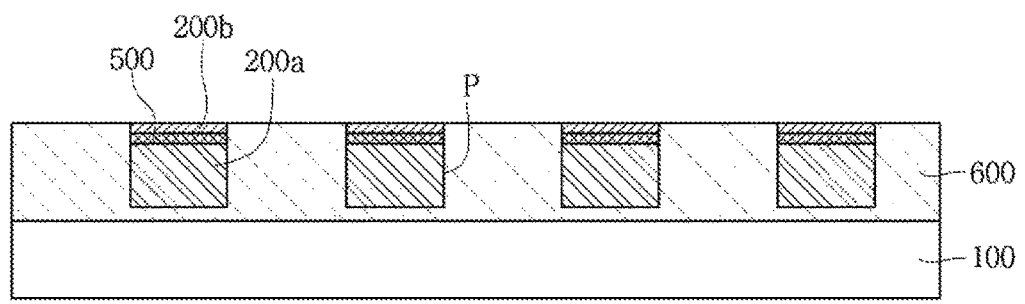

FIGS. 14 and 15 are views illustrating one cross section of the electrode layer of the touch window according to the fourth embodiment of the present invention. FIGS. 14 and 15 illustrate the sensing electrode. However, in the below description, the electrode layer may also include the wired electrode other than the sensing electrode.

Referring to FIGS. 14 and 15, the touch window according to the fourth embodiment may further include a middle layer, i.e., a resin layer 600 disposed on the substrate 100.

Referring to FIG. 14, the resin layer 600 may include a first pattern 610 and a second pattern 620. The first pattern 610 and the second pattern 620 may have sizes different from each other. Specifically, the second pattern 620 may have a size larger than that of the first pattern 610. For example, a width of the first pattern 610 may have a nanometer size (nm), and a width of the second pattern 620 may have a micrometer size (μm).

The conductive layer 200a may be disposed on the second pattern 620. For example, a conductive material forming the conductive layer 200a is disposed on both of the first pattern 610 and the second pattern 620, and then the conductive material is allowed to remain on only the second pattern 620 due to a difference of an etching speed according to a difference between a bonding area of the conductive material and the first pattern 610 and a bonding area of the conductive material and the second pattern 620 when performing an etching process, and thus the conductive layer 200a is allowed to remain on only the second pattern 620.

The above-described protective layer 200b may be disposed on the conductive layer 200a, and the above-described buffer layer 500 may be disposed between the conductive layer 200a and the protective layer 200b. FIG. 14 illustrate s a state in which the protective layer 200b is disposed on only the upper surface of the conductive layer 200a. However, the embodiment is not limited thereto, and the protective layer 200b may be disposed on at least one of the upper surface, the lower surface and the side surface of the conductive layer 200a.

Referring to FIG. 15, the resin layer 600 may include a pattern P. For example, the resin layer 600 may include an intaglio pattern.

The conductive layer 200a may be disposed on the pattern P. For example, the conductive layer 200a may be disposed inside the intaglio pattern.

The above-described protective layer 200b may be disposed on the conductive layer 200a, and the above-described buffer layer 500 may be disposed between the conductive layer 200a and the protective layer 200b. FIG. 15 illustrate s a state in which the protective layer 200*b* is disposed on only the upper surface of the conductive layer 200*a*. However, the embodiment is not limited thereto, and the protective layer 200*b* may be disposed on at least one of the upper surface, the lower surface and the side surface of the conductive layer 200*a*.

In the touch window according to the fourth embodiment, since the protective layer 200*b* is disposed on at least one of one surface and the other surface of the conductive layer 200*a*, oxidation of the conductive layer 200*a* may be prevented. Also, the reflection of the conductive layer 200*a* due to a total reflection property thereof may be prevented. Therefore, the touch window according to the fourth embodiment may have enhanced reliability and visibility.

Also, in the touch window according to the fourth embodiment, since the buffer layer 500 is disposed between the conductive layer 200*a* and the protective layer 200*b*, deformation of the substrate 100 and/or the electrode layer 200 may be prevented. Therefore, the touch window according to the fourth embodiment may have enhanced reliability.

The various types of touch windows according to the first, second, third and fourth embodiments will be described with reference to FIGS. 16 and 19.

Figure 16:
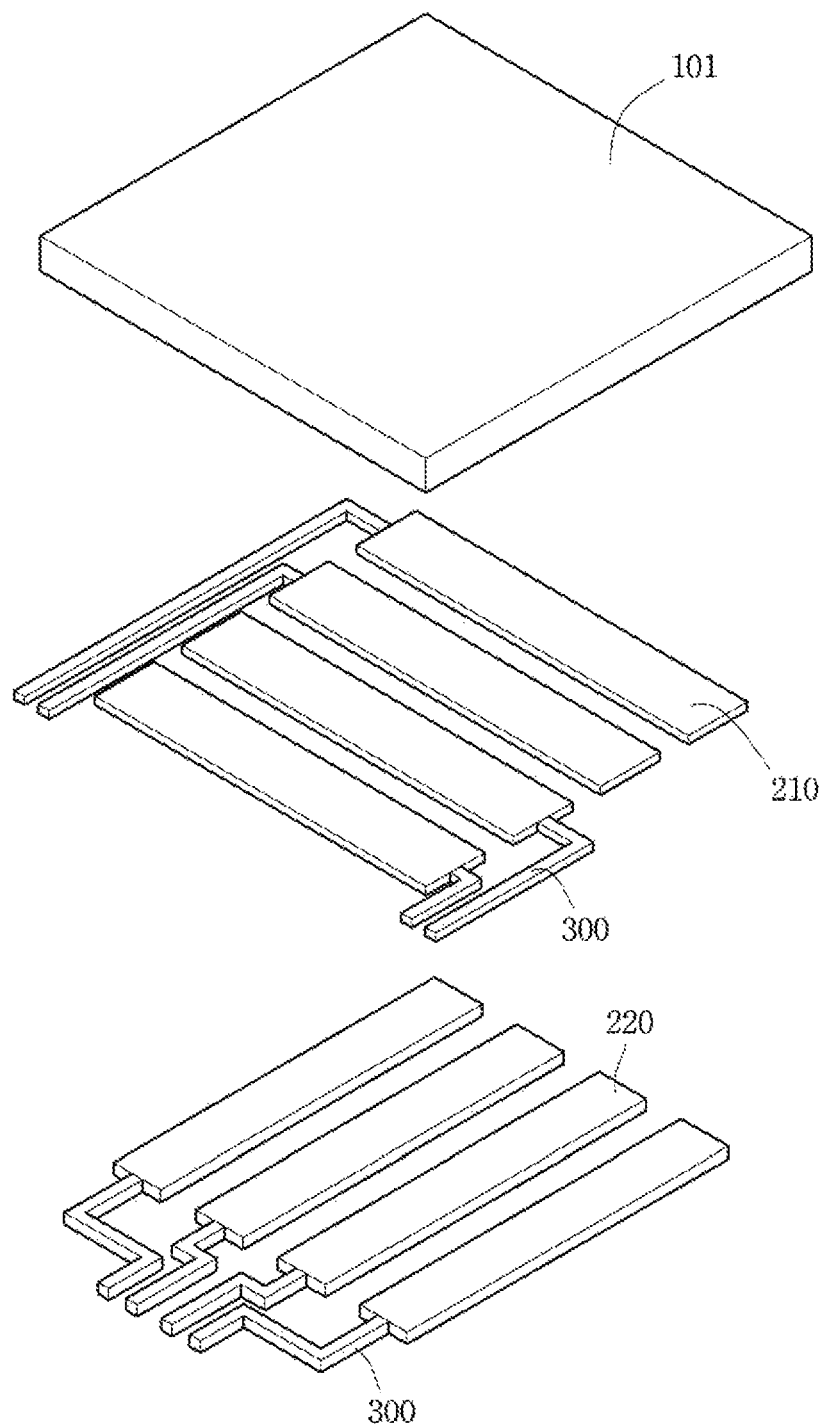
FIGS. 16 to 19 are views illustrating various types of touch windows according to the first, second, third and fourth embodiments of the present invention.

Referring to FIG. 16, the touch window according to the embodiment may include a cover substrate 101. Also, a first sensing electrode 210 and a second sensing electrode 220 may be disposed on the cover substrate 101.

For example, the first sensing electrode 210 and the second sensing electrode 220 may be disposed on one surface of the cover substrate 101. Specifically, the first sensing electrode 210 and the second sensing electrode 220 may be disposed on the same surface of the cover substrate 101.

The first sensing electrode 210 and the second sensing electrode 220 which extends in different directions from each other and a wired electrode 300 which is connected to each of the first sensing electrode 210 and the second sensing electrode 220 may be disposed on the same surface of the cover substrate 101, and the first sensing electrode 210 and the second sensing electrode 220 may be disposed on the same surface of the cover substrate 101 to be spaced apart from each other or to be insulated from each other. That is, the first sensing electrode 210 may extend in one direction, and the second sensing electrode 220 may extend in a direction different from the one direction.

Figure 17:
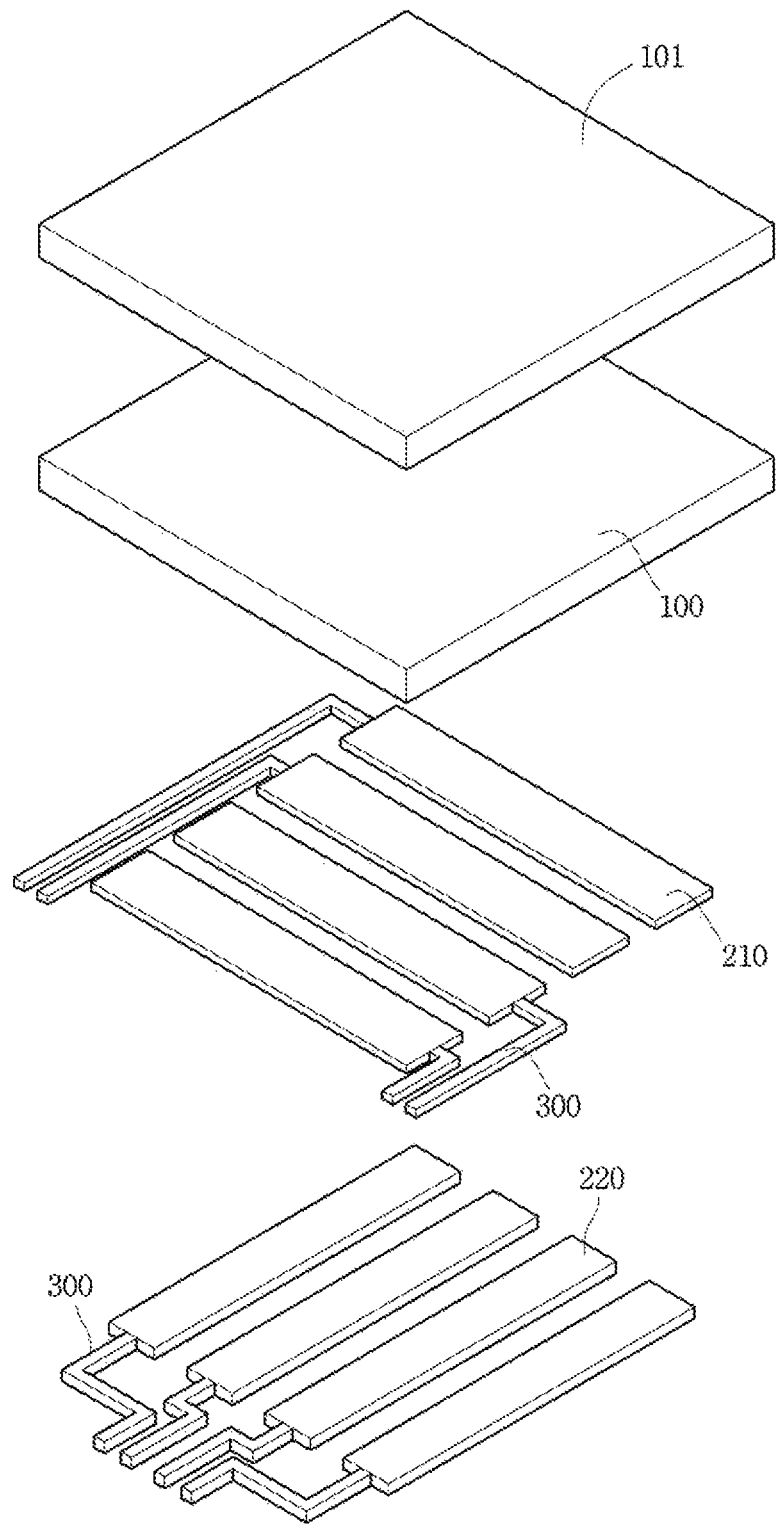

Referring to FIG. 17, the touch window according to the embodiment may include a cover substrate 101 and a substrate 100 on the cover substrate 101.

Also, a first sensing electrode 210 and a second sensing electrode 220 may be disposed on the substrate 100.

For example, the first sensing electrode 210 and the second sensing electrode 220 may be disposed on one surface of the substrate 100. Specifically, the first sensing electrode 210 and the second sensing electrode 220 may be disposed on the same surface of the substrate 100.

The first sensing electrode 210 and the second sensing electrode 220 which extends in different directions from each other and a wired electrode 300 which is connected to each of the first sensing electrode 210 and the second sensing electrode 220 may be disposed on the same surface of the substrate 100, and the first sensing electrode 210 and the second sensing electrode 220 may be disposed on the same surface of the substrate 100 to be spaced apart from each other or to be insulated from each other. That is, the first sensing electrode 210 may extend in one direction, and the second sensing electrode 220 may extend in a direction different from the one direction.

Figure 18:
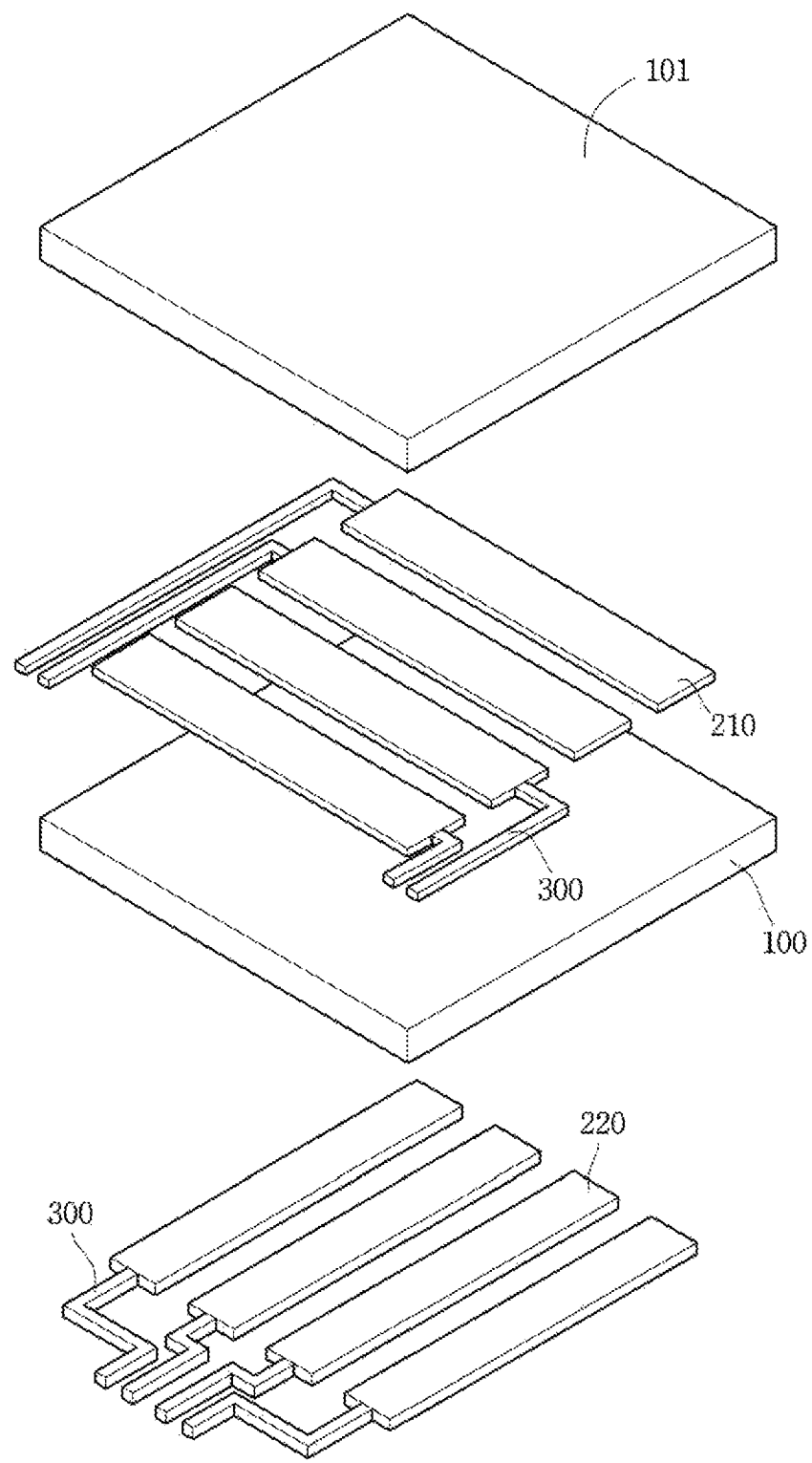

Referring to FIG. 18, the touch window according to the embodiment may include a cover substrate 101 and a substrate 100 on the cover substrate 101.

Also, a first sensing electrode 210 may be disposed on the cover substrate 101, and a second sensing electrode 220 may be disposed on the substrate 100. The substrate 100 may include a material which is the same as or similar to that of the cover substrate 101.

Specifically, the first sensing electrode 210 which extends in one direction and a wired electrode 300 which is connected to the first sensing electrode 210 may be disposed on one surface of the cover substrate 101, and the second sensing electrode 220 which extends in a direction different from that of the first sensing electrode 210 and a wired electrode 300 which is connected to the second sensing electrode 220 may be disposed on one surface of the substrate 100.

Alternatively, both of the first sensing electrode 210 and the second sensing electrode 220 may be disposed on the substrate 100. For example, the first sensing electrode 210 may be disposed on one surface of the substrate 100, and the second sensing electrode 220 may be disposed on the other surface of the substrate 100 opposite to the one surface.

Figure 19:
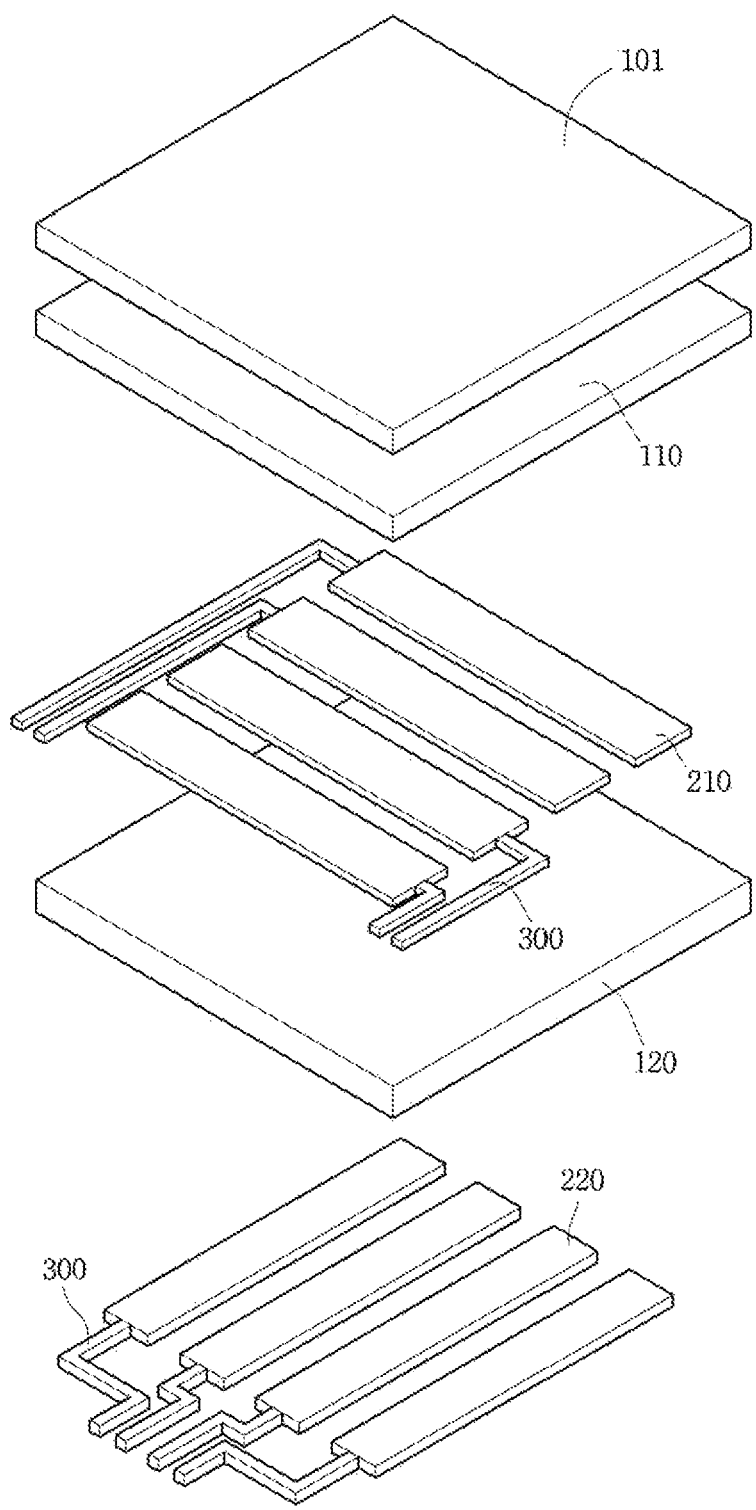

Referring to FIG. 19, the touch window according to the embodiment may include a cover substrate 101, a first substrate 110 on the cover substrate 101 and a second substrate 120 on the first substrate 110.

Also, a first sensing electrode 210 may be disposed on the first substrate 110, and a second sensing electrode 220 may be disposed on the second substrate 120.

Specifically, the first sensing electrode 210 which extends in one direction and a wired electrode 300 which is connected to the first sensing electrode 210 may be disposed on one surface of the first substrate 110, and the second sensing electrode 220 which extends in a direction different from that of the first sensing electrode 210 and a wired electrode 300 which is connected to the second sensing electrode 220 may be disposed on one surface of the second substrate 120.

Hereinafter, a touch device in which the above-described touch window is coupled to a display panel will be described with reference to FIGS. 20 to 22.

Figure 20:
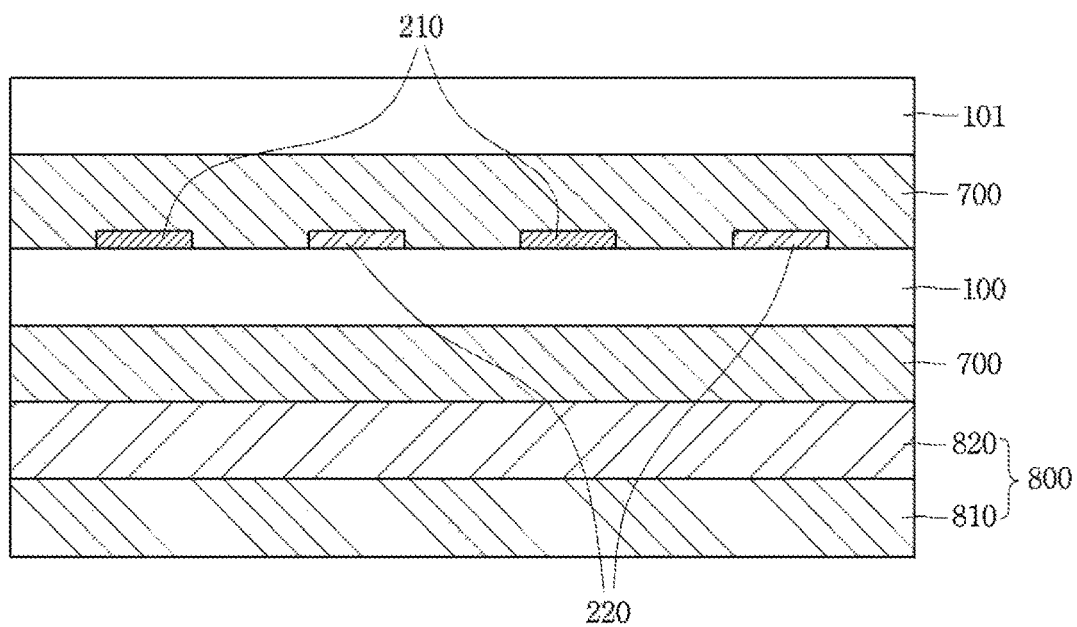
FIGS. 20 to 22 are views illustrating a touch device to which a display panel and the touch windows according to the first, second, third and fourth embodiments of the present invention are coupled.

Referring to FIG. 20, the touch device according to the embodiment may include a display panel 800 and a touch window which is disposed on the display panel 800. For example, the display panel 800 and the touch window may be bonded and coupled to each other through an adhesive layer 700 including an optically clear adhesive (OCA).

For example, FIG. 20 illustrate s a state in which the cover substrate 101 and the substrate 100 are included, and the cover substrate 101 and the substrate 100 are bonded through the adhesive layer 700, and the touch window in which the first sensing electrode 210 and the second sensing electrode 220 are disposed on the substrate 100 to be spaced apart from each other and the display panel 800 are bonded through the adhesive layer 700. However, the embodiment is not limited thereto, and the touch windows according to the previous various embodiments may be bonded to the display panel 800.

When the display panel 800 is a liquid crystal display panel, the display panel 800 may be formed in a structure in which a first substrate 810 including a thin film transistor (TFT) and a pixel electrode and a second substrate 820 including color filter layers are bonded to each other with a liquid crystal layer interposed therebetween.

Also, the display panel 800 may be a liquid crystal display panel having a color filter-on-transistor (COT) in which a TFT, a color filter and a black matrix are formed on the first substrate 810, and the second substrate 820 is bonded to the first substrate 810 with the liquid crystal layer interposed therebetween. That is, the TFT may be formed on the first substrate 810, and a protective film may be formed on the TFT, and the color filter layer may be formed on the protective layer. Also, a pixel electrode which is in contact with the TFT is formed on the first substrate 810. At this point, to enhance an opening ratio and to simplify a mask process, the black matrix may be omitted and a common electrode may perform a function of the black matrix.

Also, when the display panel 800 is the liquid crystal display panel, a display device may further include a backlight unit which provides light from a rear surface of the display panel 800.

When the display panel 800 is an organic electroluminescent display panel, the display panel 800 may include a spontaneous emitting device which does not need a separate light source. In the display panel 800, the TFT may be formed on the first substrate 810, and an organic light emitting device which is in contact with the TFT may be formed. The organic light emitting device may include an anode, a cathode and an organic light emitting layer formed between the anode and the cathode and may further include the second substrate 820 which serves as an encapsulation substrate for encapsulation on the organic light emitting device.

Figure 21:
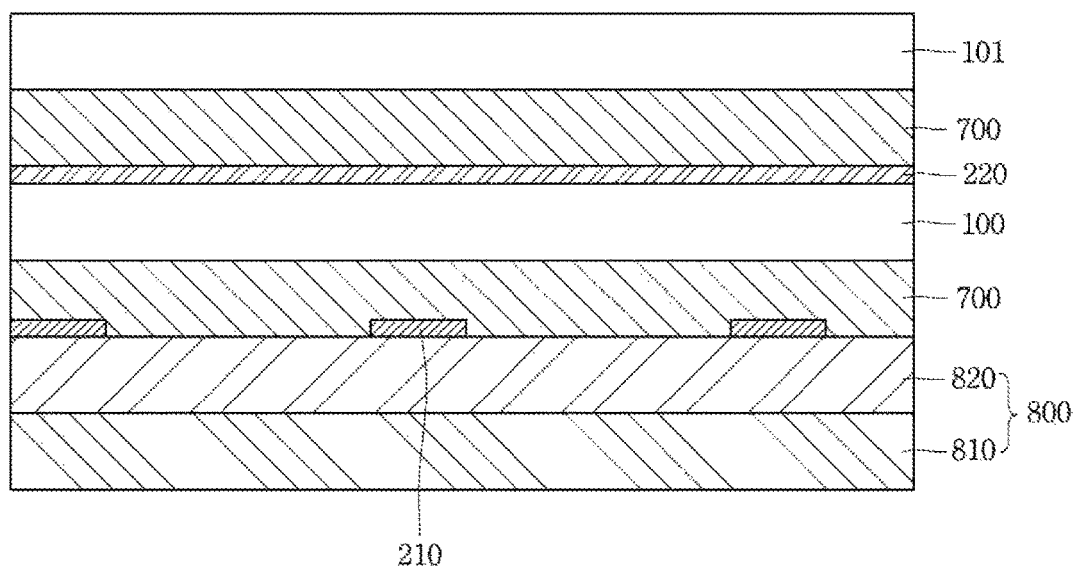

Referring to FIG. 21, a touch device according to anther embodiment may include a touch window which is integrally formed with a display panel. That is, the substrate which supports at least one electrode may be omitted.

Specifically, at least one sensing electrode may be disposed on at least one surface of the display panel 800. The display panel 800 may include a first substrate 810 and a second substrate 820. That is, at least one sensing electrode may be disposed on one surface of at least one of the first substrate 810 and the second substrate 820.

Referring to FIG. 21, a first sensing electrode 210 may be disposed on an upper surface of the display panel 800. Also, a first wire connected to the first sensing electrode 210 may be disposed. A substrate 100 on which a second sensing electrode 220 and a second wire are disposed may be formed on the display panel 800 on which the first sensing electrode 210 is disposed. An adhesive layer 700 may be disposed between the substrate 100 and the display panel 800.

The embodiment is not limited to the drawing, and any structure in which the first sensing electrode 210 is formed on the upper surface of the display panel 800 and the substrate 100 which supports the second sensing electrode 220 is disposed on the display panel 800 and the substrate 100 is bonded to the display panel 800 may be applied.

Also, the substrate 100 may be a polarizing plate. That is, the second sensing electrode 220 may be formed on an upper surface or a rear surface of the polarizing plate. Therefore, the second sensing electrode 220 may be integrally formed with the polarizing plate.

Also, the polarizing plate may be included separately from the substrate 100. At this point, the polarizing plate may be disposed under the substrate 100. For example, the polarizing plate may be disposed between the substrate 100 and the display panel 800. Also, the polarizing plate may be disposed above the substrate 100.

The polarizing plate may be a linear polarizing plate or an external light reflection preventing polarizing plate. For example, when the display panel 800 is the liquid crystal display panel, the polarizing plate may be the linear polarizing plate. Also, when the display panel 800 is the organic electroluminescent display panel, the polarizing plate may be the external light reflection preventing polarizing plate.

Figure 22:
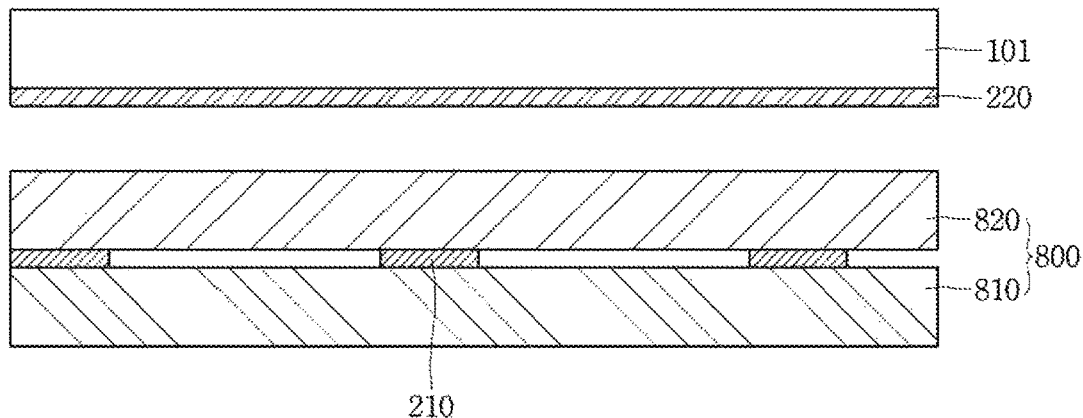

Referring to FIG. 22, a touch device according to still another embodiment may include a touch panel which is integrally formed with a display panel.

For example, a sensing electrode which is disposed at an available area to serve as a sensor for sensing a touch and a wire which applies an electric signal to the sensing electrode may be disposed inside the display panel. Specifically, at least one sensing electrode or at least one wire may be disposed inside the display panel.

The display panel may include a first substrate 810 and a second substrate 820. At this point, at least one of a first sensing electrode 210 and a second sensing electrode 220 may be disposed between the first substrate 810 and the second substrate 820. That is, at least one sensing electrode may be formed on at least one surface of the first substrate 810 or the second substrate 820.

Referring to FIG. 22, the first sensing electrode 210 and a first wire may be disposed between the first substrate 810 and the second substrate 820. Also, the second sensing electrode 220 and a second wire may be disposed on a cover substrate 101. The cover substrate 101 may be disposed on the display panel including the first substrate 810 and the second substrate 820. That is, the first sensing electrode 210 and the first wire may be disposed inside the display panel, and the second sensing electrode 220 and the second wire may be disposed outside the display panel.

The first sensing electrode 210 and the first wire may be disposed on an upper surface of the first substrate 810 or a rear surface of the second substrate 820. Also, an adhesive layer may be disposed between the cover substrate 101 and the display panel.

The embodiment is not limited to the drawing, and any structure in which the first sensing electrode 210 and the first wire are disposed inside the display panel and the second sensing electrode 220 and the second wire are disposed outside the display panel may be applied.

Also, the cover substrate 101 may be a polarizing plate. That is, the second sensing electrode 220 may be formed on an upper surface or a rear surface of the polarizing plate. Therefore, the second sensing electrode 220 may be integrally formed with the polarizing plate.

Also, the polarizing plate may be included separately from the cover substrate 101. At this point, the polarizing plate may be disposed under the cover substrate 101. For example, the polarizing plate may be disposed between the cover substrate 101 and the display panel 800. Also, the polarizing plate may be disposed above the cover substrate 101.

When the display panel is a liquid crystal display panel and the sensing electrode is formed on the upper surface of the first substrate 810, the sensing electrode may be formed together with a TFT or a pixel electrode. Also, when the sensing electrode is formed on the rear surface of the second substrate 820, a color filter layer may be formed on the sensing electrode, or the sensing electrode may be formed on the color filter layer. When the display panel is an organic electroluminescent display panel and the sensing electrode is formed on the upper surface of the first substrate 810, the sensing electrode may be formed together with the TFT or an organic light emitting device.

Hereinafter, an example of a display device to which the touch window according to the above-described embodiments is applied will be described with reference to FIGS. 23 to 26.

Figure 23:
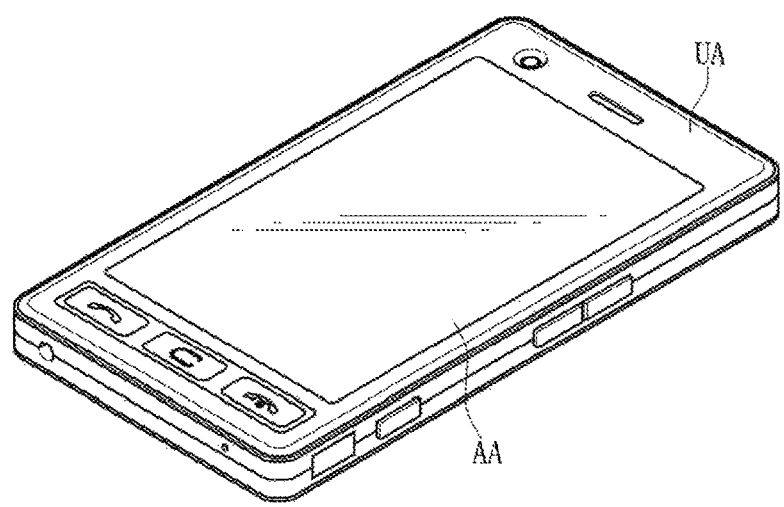
FIGS. 23 to 26 are views illustrating an example of the touch device to which the touch windows according to the first, second, third and fourth embodiments of the present invention are applied.

Referring to FIG. 23, a mobile terminal is illustrated as an example of the touch device. The mobile terminal may include an active area AA and an inactive area UA. The active area AA may sense a touch signal by a touch of a finger or the like, and a command icon pattern part, a logo or the like may be formed at the inactive area UA.

Figure 24:
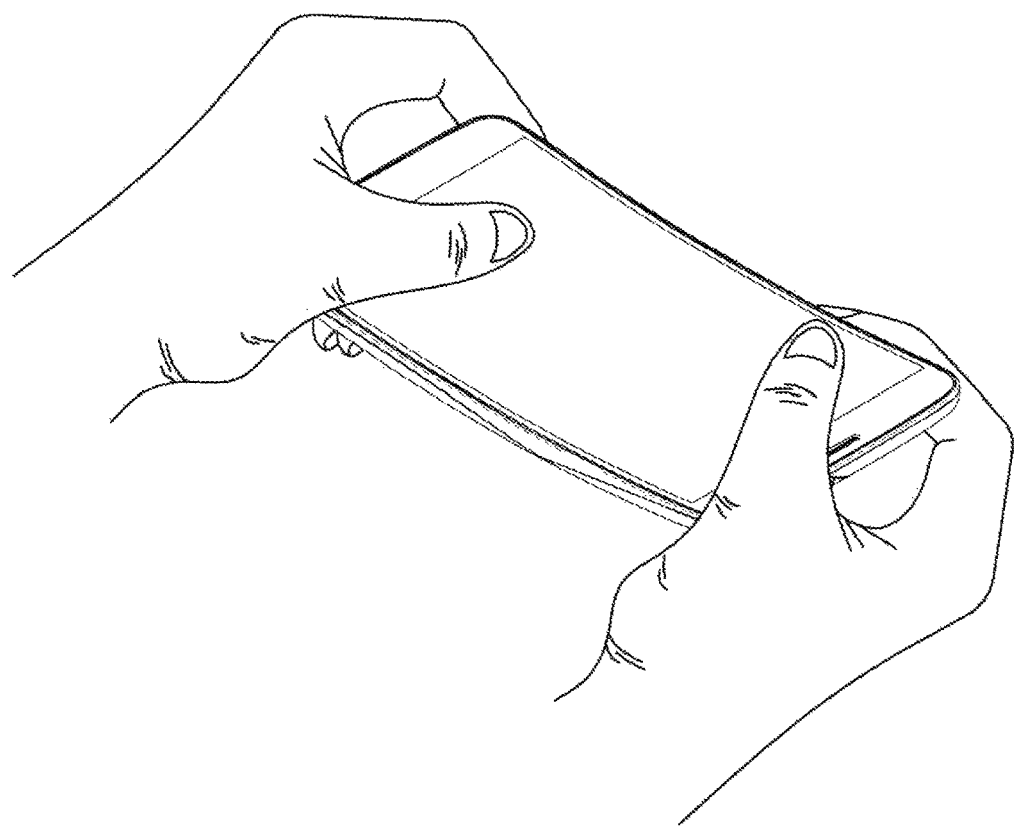

Referring to FIG. 24, the touch window may include a flexible touch window. Thus, the touch device including such a touch window may be a flexible touch device. Therefore, the touch device may be curled or bent by a user.

Figure 25:
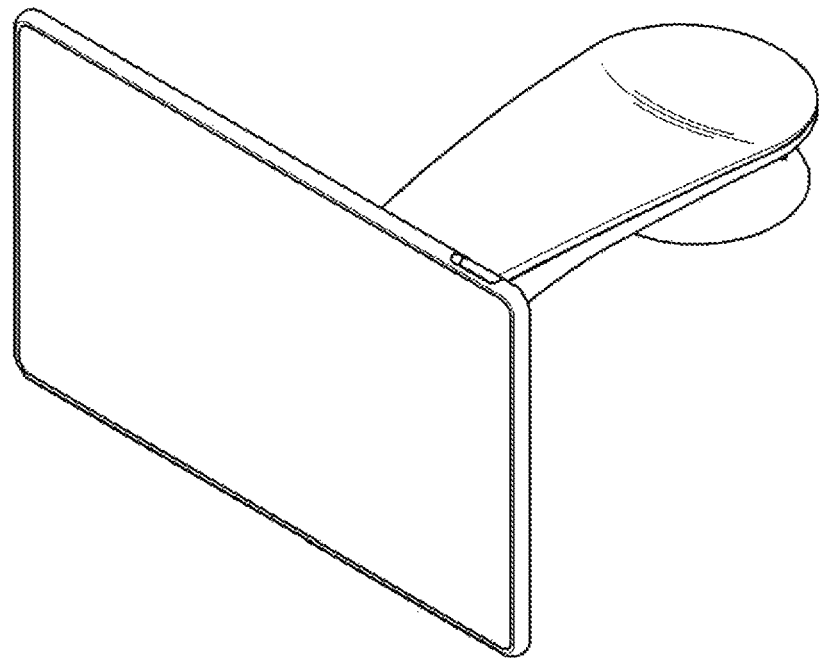

Referring to FIG. 25, the touch window may be applied to not only the touch device such as the mobile terminal but also a vehicle navigation system.

Figure 26:
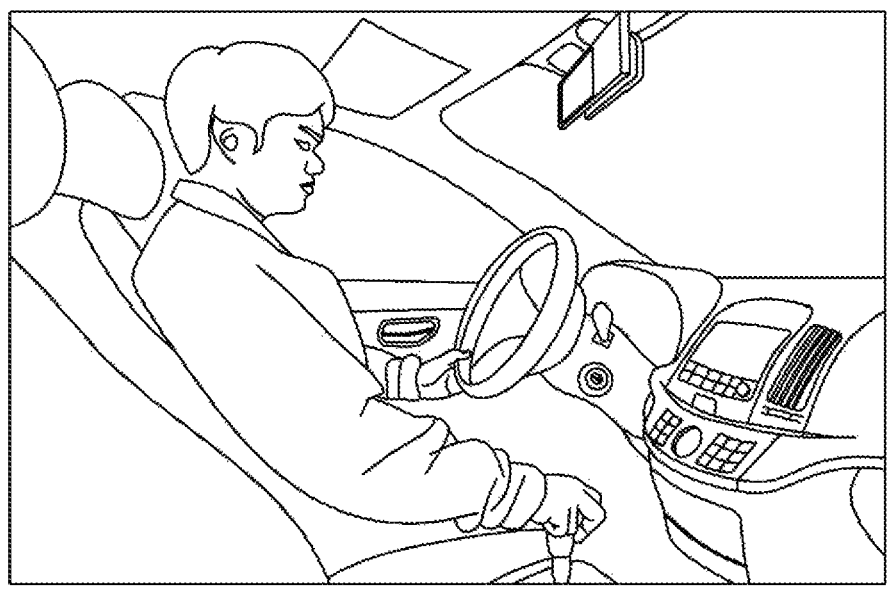

Also, referring to FIG. 26, the touch window may be applied inside a vehicle. That is, the touch window may be applied to various parts in the vehicle to which the touch window may be applied. Therefore, the touch window may be applied to not only a personal navigation display (PND) but also a dashboard and thus may realize a center information display (CID). However, the embodiment is not limited thereto, and the touch device may be used in various electronic products.

The touch window according to the first embodiment includes the electrode layer including the protective layer and the conductive layer, and the protective layer is formed to surround the upper surface and the side surface of the conductive layer. Therefore, the oxidation of the electrode can be prevented, and the reflection can also be prevented, thereby improving a problem due to the total reflection property of the metal. Also, the touch window may further include the protective layer disposed on the lower surface of the conductive layer. Therefore, the adhesion force of the conductive layer can be enhanced.

Also, the conductive layer is formed on the second pattern of the resin layer to have the width smaller than that of the second pattern. Therefore, the protective layer can be formed on only the second pattern, and the width of the electrode layer can be formed to be equal to or smaller than that of the second pattern. That is, the touch window according to the first embodiment can realize a fine line width regardless of the width of the second pattern. Therefore, the touch window according to the embodiment can have the improved optical properties such as visibility and transmittance.

The touch window according to the second embodiment may include the protective layer on the sensing electrode or the wired electrode.

Also, the nitrogen content included in the protective layer can be controlled.

Therefore, the color change of the protective layer in different environments can be minimized by controlling the nitrogen content of the protective layer. Therefore, the electrode layer can be more easily protected by preventing the deformation and corrosion of the protective layer, and the visibility of the touch window can be enhanced by preventing the electrode layer from being visible according to the color change.

Therefore, the touch window according to the second embodiment can have the enhanced reliability and efficiency, and the visibility thereof can be enhanced.

In the touch window according to the third embodiment, the electrode layer may include the conductive layer and the protective layer.

The protective layer can more easily protect the electrode layer by preventing the deformation and the corrosion of the conductive layer and can also enhance the visibility of the touch window by preventing the electrode layer from being visible according to the color change.

Also, the buffer layer can relieve the stress of the electrode layer and can enhance the reliability of the touch window by preventing the deformation of the substrate and/or the electrode layer.

Therefore, the touch window according to the third embodiment can have the enhanced reliability and efficiency and can enhance the visibility.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

What is claimed is:
1. A touch window comprising:
a substrate including an available area and an unavailable area;
a resin layer disposed on the substrate and including a first pattern and a second pattern; and
an electrode layer formed on the substrate,
wherein:
the electrode layer includes a conductive layer and a protective layer formed on the conductive layer,
the protective layer is in direct contact with the conductive layer,
the protective layer has a thickness different from that of the conductive layer, and
the protective layer includes a black-based color, and
wherein:
the electrode layer is disposed on the second pattern,
the conductive layer has a width smaller than that of the second pattern,
the protective layer includes a first protective layer formed to surround an upper surface and a side surface of the conductive layer and a second protective layer formed to be in contact with a lower surface of the conductive layer, and
the first protective layer and the second protective layer are disposed to surround the upper surface, the side surface and the lower surface of the conductive layer.

2. The touch window according to claim 1, wherein the first protective layer is formed to be in contact with an upper surface of the second pattern.

3. The touch window according to claim 1, wherein the first protective layer is disposed to be spaced apart from a side surface of the second pattern.

4. The touch window according to claim 1, wherein a width of the electrode layer is equal to or smaller than that of the second pattern.

5. The touch window according to claim 1, wherein the first protective layer is formed in a blackening material layer including one selected from CuO, CrO, FeO and $Ni_2O_3$.

6. The touch window according to claim 5, wherein the first protective layer and the second protective layer are formed of the same material.

7. The touch window according to claim 1, wherein the protective layer includes a metal nitride compound, and 1.3 weight % or more of nitrogen is included with respect to the entire metal nitride compound.

8. The touch window according to claim 1, wherein the conductive layer includes at least one of chrome (Cr), nickel (Ni), copper (Cu), aluminum (Al), silver (Ag), molybdenum (Mo), gold (Au), titanium (Ti) and an alloy thereof.

9. The touch window according to claim 7, wherein 1.3 weight % to 4 weight % of nitrogen is included with respect to the entire metal nitride compound.

10. The touch window according to claim 1, wherein the protective layer is disposed on at least one of one surface and the other surface of the conductive layer.

11. The touch window according to claim 1, wherein:
the conductive layer includes one surface which is in contact with the substrate and the other surface opposite to the one surface, and
the protective layer is disposed on the other surface of the conductive layer.

12. The touch window according to claim 1, wherein the conductive layer and the protective layer include same metal.

13. The touch window according to claim 1, wherein:
the protective layer includes niobium (Nb), and
the protective layer is disposed on at least one surface of the conductive layer.

14. The touch window according to claim 13, wherein the protective layer is disposed on both surfaces of the conductive layer.

15. The touch window according to claim 13, wherein a thickness of the protective layer is 1 nm to 30 nm.

16. The touch window according to claim 13, further comprising a buffer layer disposed between the conductive layer and the protective layer.

17. The touch window according to claim 16, wherein:
the protective layer is disposed on both surfaces of the conductive layer, and
the buffer layer is disposed between the conductive layer and the protective layer.

18. The touch window according to claim 16, wherein a thickness of the buffer layer is 1 nm to 30 nm.

19. The touch window according to claim 1, wherein:
the electrode layer includes a sensing electrode and a wired electrode connected to the sensing electrode, and
at least one of the sensing electrode and the wired electrode includes a mesh shape.

* * * * *